United States Patent
Yamamoto et al.

(10) Patent No.: US 8,962,212 B2
(45) Date of Patent: Feb. 24, 2015

(54) UNIT CELL MODULE AND GASKET FOR POLYMER ELECTROLYTE FUEL CELL

(75) Inventors: Yoko Yamamoto, Osaka (JP); Toshihiro Matsumoto, Fukuoka (JP); Takashi Morimoto, Osaka (JP); Mitsuo Yoshimura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 626 days.

(21) Appl. No.: 13/254,244

(22) PCT Filed: Mar. 3, 2010

(86) PCT No.: PCT/JP2010/001439
§ 371 (c)(1),
(2), (4) Date: Sep. 1, 2011

(87) PCT Pub. No.: WO2010/100906
PCT Pub. Date: Sep. 10, 2010

(65) Prior Publication Data
US 2011/0318665 A1 Dec. 29, 2011

(30) Foreign Application Priority Data
Mar. 4, 2009 (JP) ................................. 2009-050077

(51) Int. Cl.
H01M 8/24 (2006.01)
H01M 2/20 (2006.01)
(Continued)

(52) U.S. Cl.
CPC ............ *H01M 8/242* (2013.01); *H01M 8/0273* (2013.01); *H01M 8/0276* (2013.01);
(Continued)

(58) Field of Classification Search
USPC ................................................ 429/467–470
See application file for complete search history.

(56) References Cited

U.S. PATENT DOCUMENTS

2004/0075224 A1* 4/2004 Kuroki et al. ................. 277/650
2004/0234831 A1 11/2004 Kobayashi et al.
(Continued)

FOREIGN PATENT DOCUMENTS

JP 2000-133288 5/2000
JP 2003-56704 2/2003
(Continued)

OTHER PUBLICATIONS

Supplementary European Search Report issued Oct. 23, 2012 in European Patent Application No. 10 74 8505.
(Continued)

*Primary Examiner* — Muhammad Siddiquee
(74) *Attorney, Agent, or Firm* — Wenderoth, Lind & Ponack, L.L.P.

(57) ABSTRACT

A polymer electrolyte fuel cell-use gasket, included in a polymer electrolyte fuel cell including a fuel cell stack is provided. In the fuel cell stack, a plurality of unit cell modules is stacked, and each of the unit cell modules includes sealing members disposed at circumference portions of respective front and back surfaces of a membrane electrode assembly, and paired separators sandwiching the membrane electrode assembly and the sealing members. The sealing members are integrally molded with the circumference portions of the respective front and back surfaces of the membrane electrode assembly. In each sealing member of the gasket, two rows of sealing lips are continuously provided in parallel to each other in an in-plane manner, and at least an outer one of the two rows of sealing lips is integrally formed, having a top side bell-shaped portion overlaid on a bottom side bell-shaped portion.

7 Claims, 19 Drawing Sheets

(51) Int. Cl.
*H01M 8/02* (2006.01)
*H01M 8/10* (2006.01)

(52) U.S. Cl.
CPC .......... *H01M 8/0286* (2013.01); *H01M 8/0284* (2013.01); *H01M 8/248* (2013.01); *H01M 2008/1095* (2013.01); *Y02E 60/50* (2013.01)
USPC ........................................................ 429/469

(56) References Cited

U.S. PATENT DOCUMENTS

2005/0035560 A1* 2/2005 Segawa et al. ................ 277/634
2008/0118811 A1 5/2008 Okabe
2008/0305384 A1* 12/2008 Kawashima et al. ........... 429/34

FOREIGN PATENT DOCUMENTS

| | | |
|---|---|---|
| JP | 2004-311254 | 11/2004 |
| JP | 2004-319461 | 11/2004 |
| JP | 2004-360717 | 12/2004 |
| JP | 2005-16703 | 1/2005 |
| JP | 2005-50728 | 2/2005 |
| JP | 2005-243293 | 9/2005 |
| JP | 2006-156097 | 6/2006 |
| JP | 2007-335093 | 12/2007 |
| WO | 2004/031625 | 4/2004 |

OTHER PUBLICATIONS

International Preliminary Report on Patentability issued Sep. 22, 2011 in International (PCT) Application No. PCT/JP2010/001439.
International Search Report issued Jun. 15, 2010 in International (PCT) Application No. PCT/JP2010/001439.

* cited by examiner

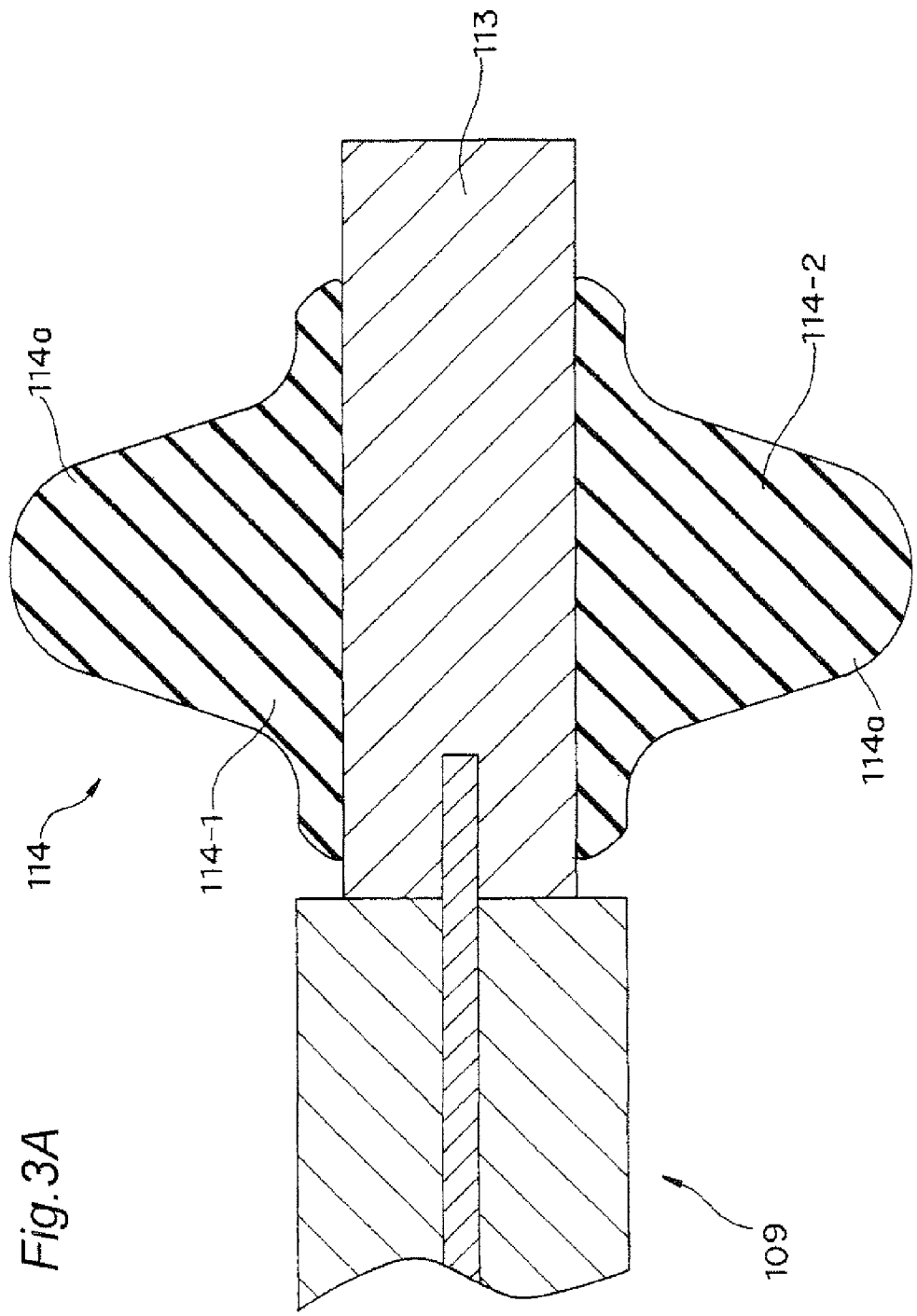

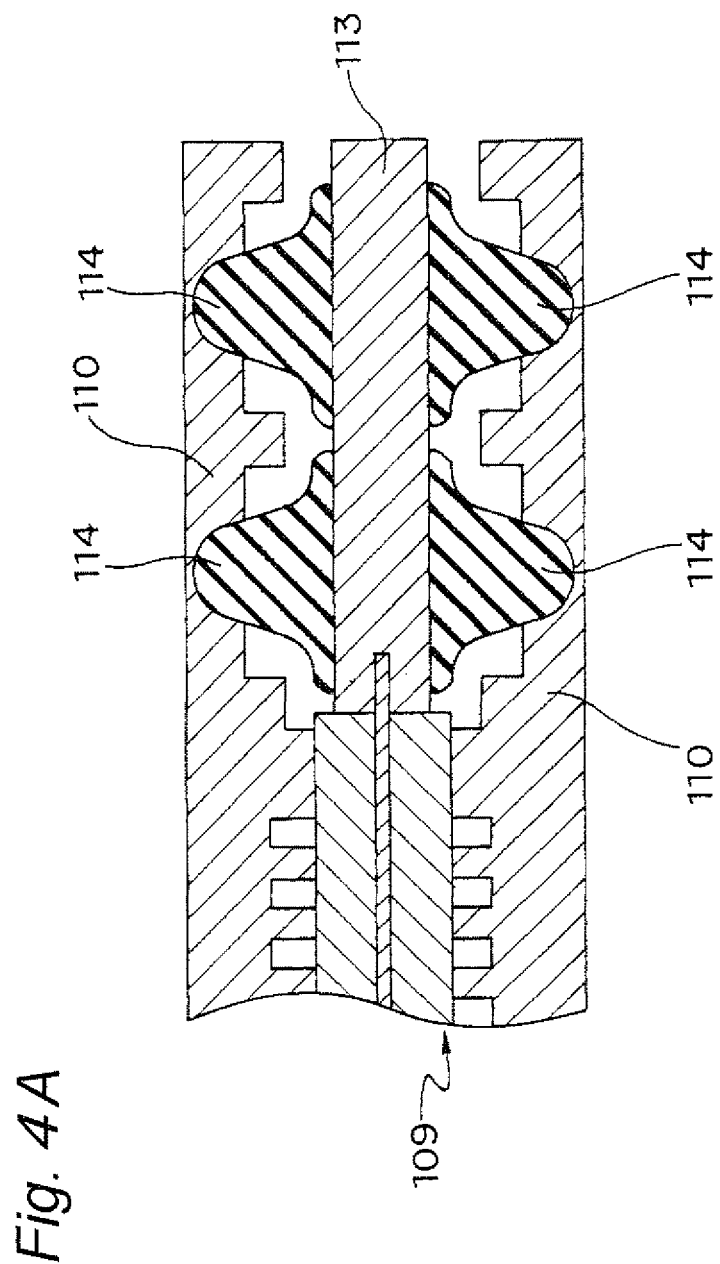

UNIT CELL MODULE AND GASKET FOR POLYMER ELECTROLYTE FUEL CELL

TECHNICAL FIELD

The present invention relates to a fuel cell used for a portable power supply, an electric vehicle-use power supply, a household cogeneration system, or the like. In particular, the present invention relates to a gasket for a polymer electrolyte fuel cell using polyelectrolyte.

BACKGROUND ART

A fuel cell using polyelectrolyte allows a hydrogen-containing fuel gas and an oxygen-containing oxidant gas, such as air, to electrochemically react with each other, such that electric power and heat are generated at the same time. The fuel cell is basically structured with a polymer electrolyte membrane that selectively transports hydrogen ions, and paired electrodes formed on both the surfaces of polymer electrolyte membrane, i.e., the anode and the cathode, respectively. These electrodes each have a catalyst layer whose principal component is carbon powder bearing platinum metal catalyst and which is formed on the front surface of the polymer electrolyte membrane, and a gas diffusion layer which has combined features of air permeability and electronic conductivity and which is disposed on the outer surface of the catalyst layer. Such an assembly made up of the polymer electrolyte membrane and the electrodes (including the gas diffusion layers) being integrally joined and assembled is referred to as an electrolyte membrane electrode assembly (hereinafter referred to as the "MEA").

Further, on the opposite sides of the MEA, electrically conductive separators for mechanically clamping the MEA to fix the same, and for establishing electrical connection in series between the MEA and adjacent MEA, are disposed, respectively. In each separator, at the portion to be brought into contact with the MEA, gas flow channels for supplying corresponding electrodes with the fuel gas or a reactant gas such as the oxidant gas, and for carrying away the generated water or excess gas are formed. Though the gas flow channels can be provided separately from the separators, what is generally employed is to form grooves on the front surfaces of the separators to serve as the gas flow channels. It is to be noted that, such a structure body in which the MEA is clamped between the paired separators is referred to as the "unit cell module".

Supply of the reactant gas to the gas flow channels formed between the separators and the MEA and discharge of the reactant gas and the generated water from the gas flow channels are each carried out in the following manner: through holes called manifold holes are provided at the edge portion of at least one of the paired separators, to establish communication between the inlet/outlet port of each of the gas flow channels and each of the manifold holes, and the reactant gas is distributed to the gas flow channels from the manifold holes.

Further, in order to prevent external leakage of the fuel gas or the oxidant gas supplied to the gas flow channels, or to prevent mixture of the gases of two types, gas sealing members or gaskets are disposed as sealing members between the paired separators, at the places where the electrodes are formed in the MEA, that is, so as to surround the external circumference of the power generation areas. The gas sealing members or the gaskets also seal the circumference of each of the manifold holes.

Since the fuel cell generates heat while driving, the cell must be cooled by coolant or the like, in order to maintain the cell at an excellent temperature state. Normally, a cooling portion for allowing the coolant to flow is provided every one to three cells. The general structure of a stacked battery (fuel cell stack) is as follows: the MEA, the separators, and the cooling portions are alternately stacked by ten to two hundred cells; thereafter, an end plate is disposed at each of the end portions of the whole cells with a current collector and an insulating plate interposed between the endplate and the end portion thereof, such that the whole cells are clamped between such paired end plates and fixed from both the ends through the use of fastening bolts (rods) or the like. As to the fastening method, the general method is to fasten with fastening bolts which are inserted into through holes formed at the edge portions of the separators; or to fasten up the entire stacked battery with a metal belt, having the end plates interposed therebetween.

With the stacked battery employing such a fastening method, it is important to fasten and seal the unit cell module with a fastening force which is uniform in a plane (i.e., within a plane perpendicular to the stacked direction). Recently, in order to ensure safety, a double seal capable of surely separating the combustible gas and the outside air is demanded. However, for the purpose of reducing the costs, a reduction both in the size and space of the stack is also demanded. Meeting the demand for the double seal generally invites an increase in the fastening load, complication in the fastening members, and an increase in the volume of the stack. Therefore, the demand for the double seal and the demand for a reduction both in the size of the stack and in the fastening force are conflicting.

In connection with such a fuel cell-use seal, as shown in FIG. 8, what is devised by Patent Document 1 is a carbon member as one example, which has a gasket provided with two lips 200 in parallel to each other, to thereby secure the sealing performance without inviting an increase in the surface pressure, taking into consideration of a reduction in thickness of the sealing portion, an improvement in assemblability, prevention of misalignment, a reduction in surface pressure, and excellent evenness in surface pressure.

Further, Patent Document 2 proposes a gasket 201 having a two-stepped structure which is shown in FIG. 9, as one example of a gasket capable of satisfying the requirement for a reduction in the reaction force, preventing the lip from collapsing, and maintaining the sealing performance even with slight unevenness or steps on the counter face. The gasket 201 is attached through integral molding to one of two members opposing to each other. A sealing lip 202 integrally molded to the gasket 201 to be brought into close contact with the other member is in a shape having a small collapsed volume for achieving a reduction in the reaction force.

Patent Document 3 discloses a fuel cell-use gasket including a sealing portion having an internal seal formed with a lip having a substantially triangular cross section projecting toward both sides, and an external seal positioned externally to the internal seal and formed with a lip having substantially triangular cross section projecting toward both sides, in which the internal seal and the external seal are coupled with an annular coupling portion. With such a structure, it achieves an excellent sealing performance and a suppressed reaction force, and solves the problem of the gasket being collapsed.

Patent Document 4 discloses a sealing portion provided with a sealing lip having a bidirectional sealing performance, in which a sealing lip possessing a unidirectional sealing performance is provided on one side or on both the sides of the sealing lip. Such a structure is capable of satisfying the requirement for a reduction in the reaction force, maintaining the sealing function even upon an occurrence of a collapsing phenomenon at the lip, and further, maintaining the sealing function even with slight unevenness or steps on the counter face.

Patent Document 5 discloses paired interval restricting portions, each having a cross section of a rectangular shape or the like and disposed around the periphery of a rubber sheet, in which a lip line portion having a cross section of a bell-shape or a triangular shape is disposed between the paired interval restricting portions. The paired interval restricting portions is to control the dimension such that the desired behavior of compression deformation is attained by the lip line portion.

Patent Document 6 discloses a flat seal structure with a bead-like sealing lip (also referred to as a bead) in which a rubber as a gasket body that is made of a rubber-like elastic material and that has a sealing lip portion is formed to have a triangular or bell-shaped cross section. Further, Patent Document 6 also discloses a gasket body on each of both the sides of an electrolyte membrane, the gasket body being provided with bead-like sealing lip portions two-pieces each. This makes it possible to prevent a reduction in the surface pressure peak value of the gasket body, even in a case where the bonding position of resin films on both the sides are somewhat displaced sideways.

PRIOR ART DOCUMENTS

Patent Documents

Patent Document 1: Japanese Unexamined Patent Publication No. 2000-133288 (page 4, FIG. 3)
Patent Document 2: Japanese Unexamined Patent Publication No. 2005-016703 (page 7, FIG. 3)
Patent Document 3: Japanese Unexamined Patent Publication No. 2007-335093 (page 4, FIG. 3)
Patent Document 4: Japanese Unexamined Patent Publication No. 2004-360717 (pages 5 and 7, FIG. 5)
Patent Document 5: United States Patent Application Publication 2008/0118811 (pages 3 and 4, FIGS. 5 and 6)
Patent Document 6: United States Patent Application Publication 2004/0075224 (page 11, FIGS. 4 and 11)

SUMMARY OF THE INVENTION

Issues to be Resolved by the Invention

However, in meeting the demand for a double seal between the combustible gas and the outside air for ensuring safety, the fuel cell-use gaskets of Patent Documents 1 to 6 fail to solve a plurality of issues, such as a reduction in the size and space of the stack, a reduction in fastening pressure, and maintenance of an ensured sealing performance. In particular, with Patent Document 1, a low sealing performance is exhibited because the lips are too small for retaining a double-ensured sealing performance. With Patent Document 2, when simply a double seal is employed, it invites an increase in the area required for the seal, which consequently invites an increase in both the stack volume and the fastening pressure.

Accordingly, an object of the present invention is to resolve the issues described above, and to provide a polymer electrolyte fuel cell-use gasket which, in connection with a polymer electrolyte fuel cell, provides a double seal structure capable of surely securing the sealing performance, and which is at the same time capable of achieving the conflicting demands, i.e., a reduction in size of the stack and a reduction in the fastening force.

Means for Resolving the Issues

In order to achieve the object, the present invention is structured as follows.

A polymer electrolyte fuel cell-use gasket according to a first aspect of the present invention provides a polymer electrolyte fuel cell-use gasket, included
in a polymer electrolyte fuel cell comprising a fuel cell stack in which a stacked product assembled by being clamped by a fastening member via paired end plates respectively disposed at both ends of the stacked product, the stacked product being structured with a plurality of unit cell modules being stacked, each of the unit cell modules comprising: a membrane electrode assembly; a sealing member disposed at an external circumference of each of both front and back surfaces of the membrane electrode assembly; and paired separators sandwiching the membrane electrode assembly and the sealing member, characterized in that
the sealing member is integrally molded with the external circumference portion of each of both the front and back surfaces of the membrane electrode assembly,
as the sealing member, two rows of sealing lips each having a sealing performance are continuously provided in parallel to each other in an in-plane manner,
at least an outer one of the two rows of sealing lips is integrally formed having a top side bell-shaped portion overlaid on a bottom side bell-shaped portion, and
a radius of curvature of an apex of the bottom side bell-shaped portion is greater than a radius of curvature of an apex of the top side bell-shaped portion.

According to a second aspect of the present invention, what is provided is the polymer electrolyte fuel cell-use gasket according to the first aspect, wherein
defining that the radius of curvature of the apex of the bottom side bell-shaped portion is $R_1$, and that the radius of curvature of the apex of the top side bell-shaped portion is $R_2$, a correlation between the radius of curvature $R_1$ and the radius of curvature $R_2$ satisfies $R_1 \times 0.5 \geq R_2$, and
a height of a portion between the two rows of sealing lips is formed to be lower than a height at which the separator at each of both the front and back surfaces of the membrane electrode assembly fastens the two rows of sealing lips.

According to a third aspect of the present invention, what is provided is the polymer electrolyte fuel cell-use gasket according to the first or second aspect, wherein
a vertex angle of the bottom side bell-shaped portion and a vertex angle of the top side bell-shaped portion are each 18° or more, and
a dimension in a thickness direction from a front surface of the external circumference of the membrane electrode assembly to the apex of the top side bell-shaped portion relative to an entire width being perpendicular to a thickness direction of the two rows of sealing lips and along a direction perpendicular to an extending direction of each of the two rows of sealing lips is 60% or less.

According to a fourth aspect of the present invention, what is provided is the polymer electrolyte fuel cell-use gasket according to one of the first to third aspects, wherein
a cross section nearby the apex of the top side bell-shaped portion and a cross section nearby the apex of the bottom side bell-shaped portion are both circular,
the top side bell-shaped portion is a deformation facilitated portion, in which a portion of the apex of the top side bell-shaped portion elastically deforms greater than a portion of the apex of the bottom side bell-shaped portion does with being brought into contact with the separator when the fuel cell stack is assembled, and the bottom side bell-shaped portion is a seal area enlarging portion, in which, after the deformation facilitated portion elastically deforms greatly, the portion of the apex of the bottom side bell-shaped portion deforms to enlarge a seal area relative to the separator.

With such a structure, a reduction in both the reaction force and the width of the double seal can be realized, and the ensured sealing performance can be secured. Therefore, the present structure can provide a double seal structure which realizes a reduction in both the fastening force and the size of the fuel cell stack.

Effects of the Invention

As has been described in the foregoing, the polymer electrolyte fuel cell gasket of the present invention can implement a space-saving double seal that invites low reaction force. Therefore, it becomes possible to realize a reduction in the fastening force of the stack, and to reduce the stack in size. Further, it exhibits the effect that the stack can stably be fastened, that the doubled sealing performance as compared to the conventional example can be exhibited, and that the fastening structure can be simplified.

BRIEF DESCRIPTION OF THE DRAWINGS

These and other aspects and features of the present invention will become clear from the following description taken in conjunction with the preferred embodiments thereof with reference to the accompanying drawings, in which:

FIG. 3A is a partial cross-sectional view of a gasket structure according to a conventional example (a partial cross-sectional view of the gasket structure according to the conventional example taken along a similar portion as line A-A in FIG. 2A);

FIG. 4A is a partial cross-sectional view of a double seal structure with respect to the MEA and to the paired separators using gaskets of the conventional example (a partial cross-sectional view of the double seal structure according to the conventional example taken along a similar portion as line A-A in FIG. 2A), in which the gaskets and the separators are virtually assembled;

DESCRIPTION OF EMBODIMENTS

In the following, with reference to the drawings, a description will be given of modes for carrying out the present invention.

First Embodiment

Figure 1:
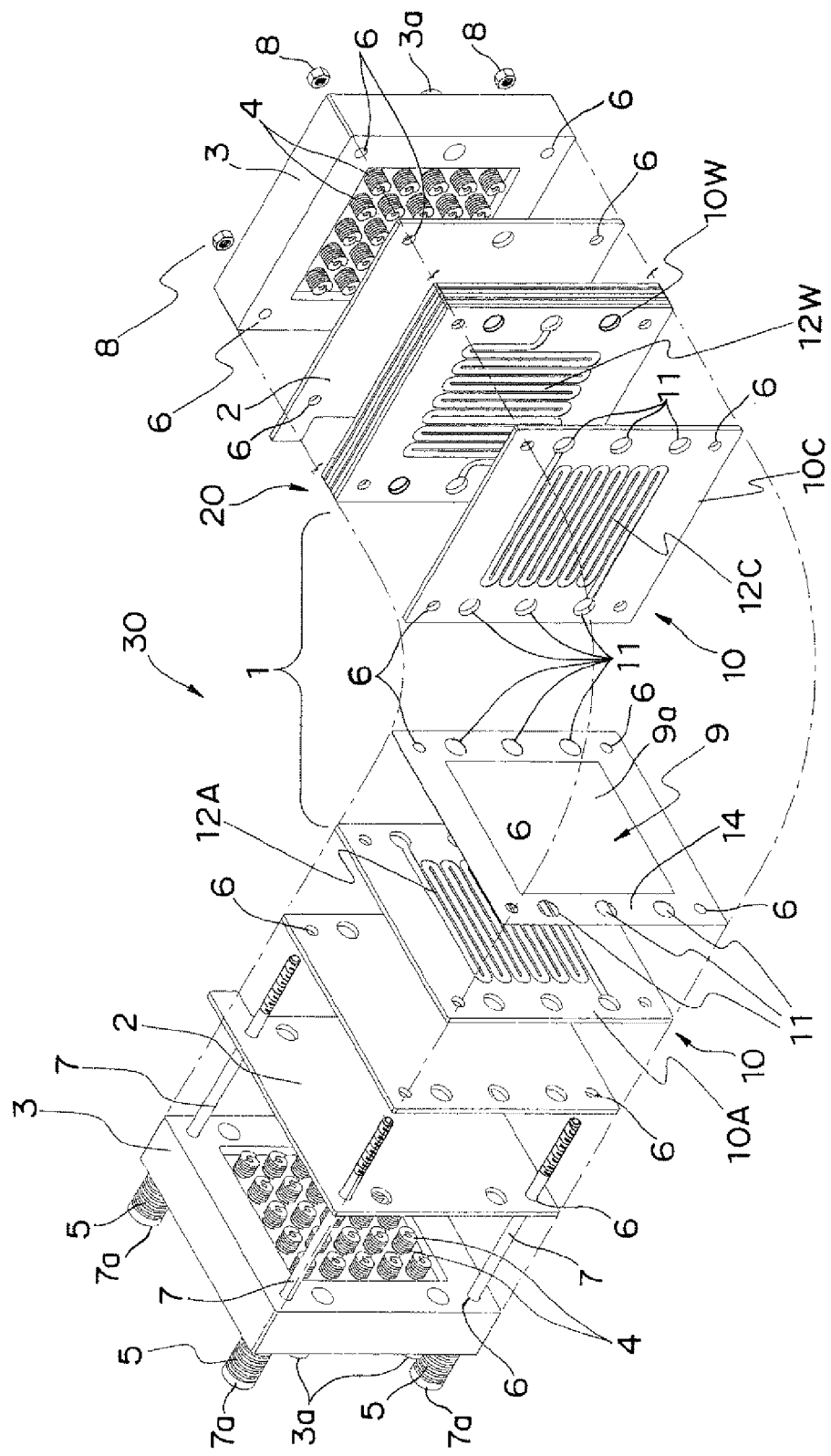
FIG. 1 is an exploded perspective view of a fuel cell stack according to a first embodiment of the present invention.

FIG. 1 is a perspective view schematically showing the structure of a fuel cell stack 30 being one example of a polymer electrolyte fuel cell (PEFC) according to a first embodiment of the present invention in a partially exploded manner. As shown in FIG. 1, the fuel cell stack 30 includes, at its central portion, a cell stacked product 20 which is made up of a plurality of unit cell modules (cells) 1 being stacked. It is to be noted that, at the outermost layer of each of both the end portions of the cell stacked product 20, a current collector 2 and an end plate 3 are disposed, the end plate 3 having on its inner plane a multiple internal springs 4 as one example of the elastic body. Four fastening bolts 7 each having an external spring 5 fitted to their respective head portions 7a penetrate from one end portion of the cell stacked product 20 through bolt holes 6 formed at the corners of each of the end plate 3, the current collector 2, the cell stacked product 20, the current collector 2, and the endplate 3, and are fastened by having nuts 8 screwed. In the first embodiment, as one example, the cells 1 are stacked by sixty pieces to structure the cell stacked product 20, and fastened by the fastening bolts 7 inserted into the bolt holes 6 and the nuts 8, as one example of the fastening member. It is to be noted that, the fastening member is not limited to those structured with the fastening bolts 7 and the nuts 8, and may be other structure such as fastening bands.

As one example, what is employed as each of the current collectors 2 is a gold-plated copper plate, which is disposed at each of both the outer sides of the cell stacked product 20, such that the generated electricity is collected efficiently. It is to be noted that, as the current collectors 2, a metal material exhibiting an excellent electric conductivity, e.g., iron, stainless steel, aluminum, or the like may be employed. Further, the current collector 2 may be surface-treated by tin plating, or nickel plating, or the like. On the outer side of each current collector 2, the end plate 3 using an electrically insulating material for insulating electricity is disposed, so as to also serve as an insulator. Here, as one example, the end plates 3 are prepared by injection molding using polyphenylene sulfide resin. Pipes 3a integrated with the end plates 3 are pressed against manifolds of the cell stacked product 20 to establish communication, via gaskets (not shown) that function as one example of the manifold-use sealing members and that have manifold-use through holes. The fastening dimension is managed such that, for example, a load of 8.4 kN is applied to the cell stacked product 20 when fastened in a state where the multiple internal springs 4 on the inner side of each end plate 3 that apply load to the cell 1 are disposed evenly and in a centered manner at the projection portion of the electrolyte membrane electrode assembly (hereinafter referred to as "MEA") 9, that is, on the inner side of the cell 1. The external springs 5 are disposed between the head portions 7a of their respective fastening bolts 7 and the outer surface of the end plate 3, and are adjusted by a plurality of fastening bolts 7 and a plurality of nuts 8 when assembled, and fastened by 10 kN, for example.

The cell 1 is structured as follows: the MEA 9 having the gaskets 14, each as one example of the sealing member, at its circumferential portion of both the front and back surfaces, is clamped between paired electrically conductive separators 10, specifically, an anode-side separator 10A and a cathode-side separator 10C; and further, on the outer side of one separator, e.g., the cathode-side separator 10C, a coolant separator 10W is disposed. At the circumferential portion of each of the separators 10A and 10C and the MEA 9, paired through holes through which the fuel gas, the oxidant gas, and the coolant flow, respectively, i.e., manifold holes 11 (11A, 11C, and 11W) are bored. Further, at the coolant separator 10W, paired through holes through which the fuel gas, the oxidant gas, and the coolant flow, respectively, i.e., manifold holes 11 (11A, 11C, and 11W) are bored. In a state of the cell stacked product 20 in which a plurality of cells 1 are stacked, the manifold holes 11 are stacked to one another to establish communication with one another, to thereby independently form the fuel gas-use manifold 11A, the oxidant gas-use manifold 11C, and the coolant-use manifold 11W.

The body portion 9a of the MEA 9 is structured with a polymer electrolyte membrane that selectively transports hydrogen ions, and paired electrode layers formed on both the inner and outer sides of the polymer electrolyte membrane inner than the circumferential portion, that is, anode and cathode electrode layers. The electrode layers each have a layered structure, in which a gas diffusion layer, and a catalyst layer disposed between the gas diffusion layer and the polymer electrolyte membrane are provided.

The anode-side separator 10A and the cathode-side separator 10C are flat plate-like, and the plane which is in contact with the MEA 9, that is, the inner plane, is structured to have a shape conforming to the shape of the body portion 9a of the MEA 9 and that of the gasket 14. As one example, glassy carbon (thickness: 3 mm) available from Tokai Carbon Co., Ltd. can be used for each of the anode-side separator 10A and the cathode-side separator 10C. As to the separators 10A, 10C, and 10W, various manifold holes and the bolt holes 6 pass throughout the separators 10A, 10C, and 10W in the thickness direction. Further, on the inner plane of the separators 10A and 10C, the fuel gas flow channel groove 12A and the oxidant gas flow channel groove 12C are formed, respectively. On the inner plane (the plane on the cathode-side separator 10C side) of the separator 10W, the coolant flow channel groove 12W is formed. The various manifold holes, the bolt holes 6, the fuel gas flow channel groove 12A, the oxidant gas flow channel groove 12C, the coolant flow channel groove 12W and the like are formed by cutting work or molding work.

The gaskets 14 disposed on the front surface and the back surface of the MEA 9, respectively, are each a sealing member structured with an elastic body integrally formed with the MEA 9. The gaskets 14 deform so as to conform to the shape of the inner surfaces of the separators 10A and 10C, since the MEA 9 is pressed against the separators 10A and 10C. Thus, the external circumference of the body portion 9a of the MEA 9 and the external circumference of the manifold holes 11 (11A, 11C, and 11W) are sealed with the gaskets 14 (14A, 14C, and 14W).

Figure 2A:
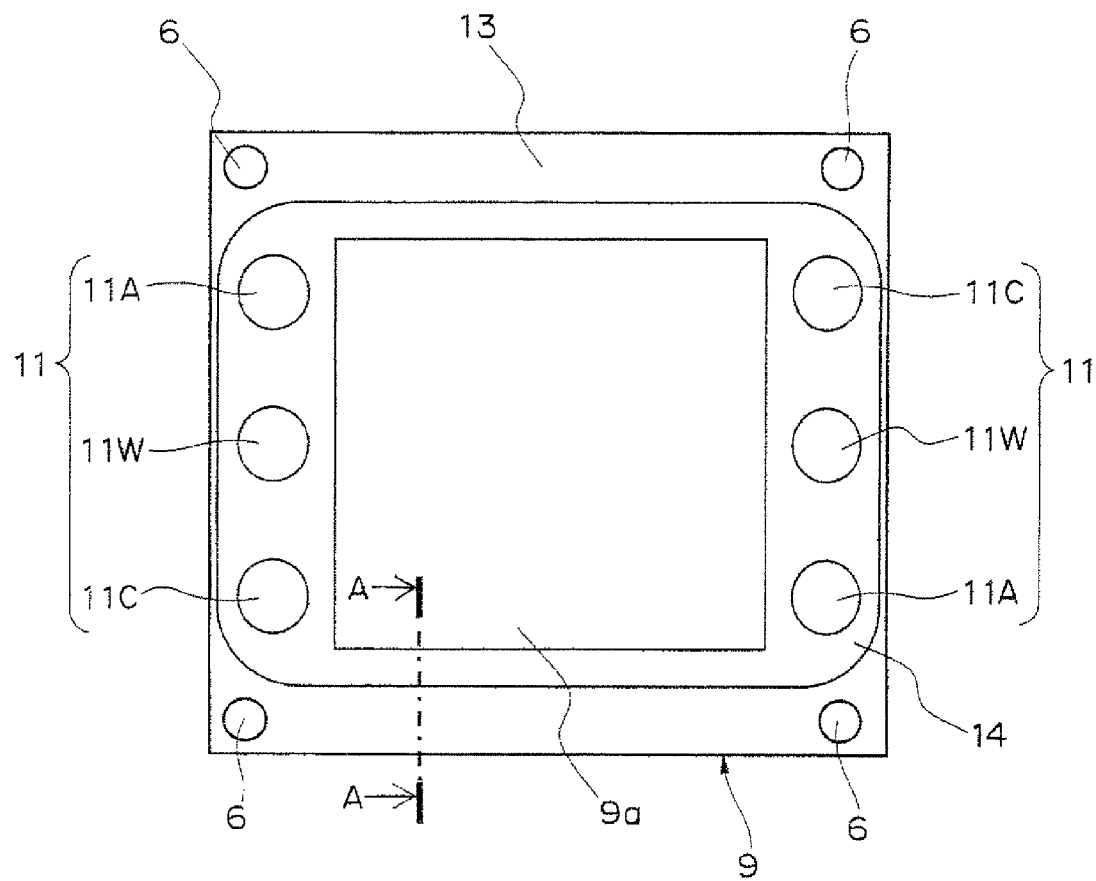
FIG. 2A is a plan view schematically showing an MEA and a gasket structure of the fuel cell stack in FIG. 1.
Figure 2B:
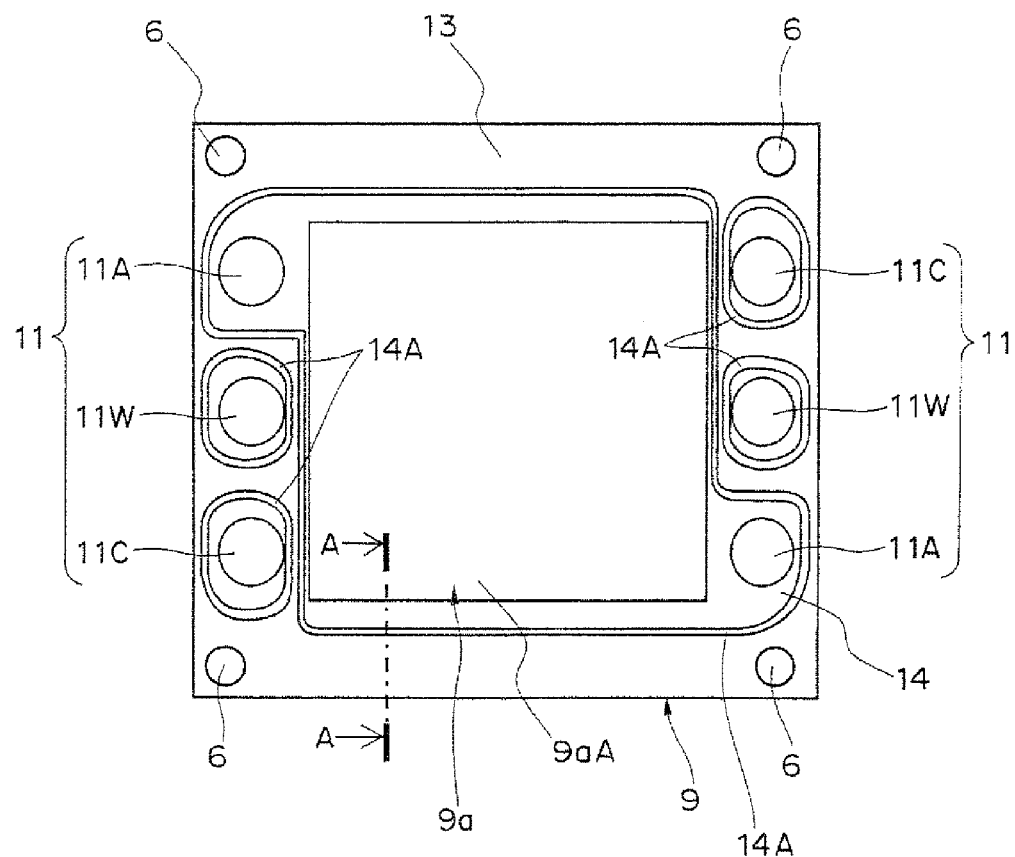
FIG. 2B is a plan view showing a fuel gas-use gasket structure of the MEA adjacent to the fuel gas flow channel groove of the separator 10A of the fuel cell stack shown in FIG. 1.

As one example, FIG. 2B is a plan view showing the fuel gas-use gasket structure of the MEA 9 adjacent to the fuel gas flow channel groove 12A of the separator 10A of the fuel cell stack shown in FIG. 1. The fuel gas-use gasket 14A is structured to partition such that the space with which the fuel gas-use manifold hole 11A and the fuel gas-use body portion 9aA establish communication, the oxidant gas-use manifold 11C, and the coolant-use manifold 11W become independent of one another.

Figure 2C:
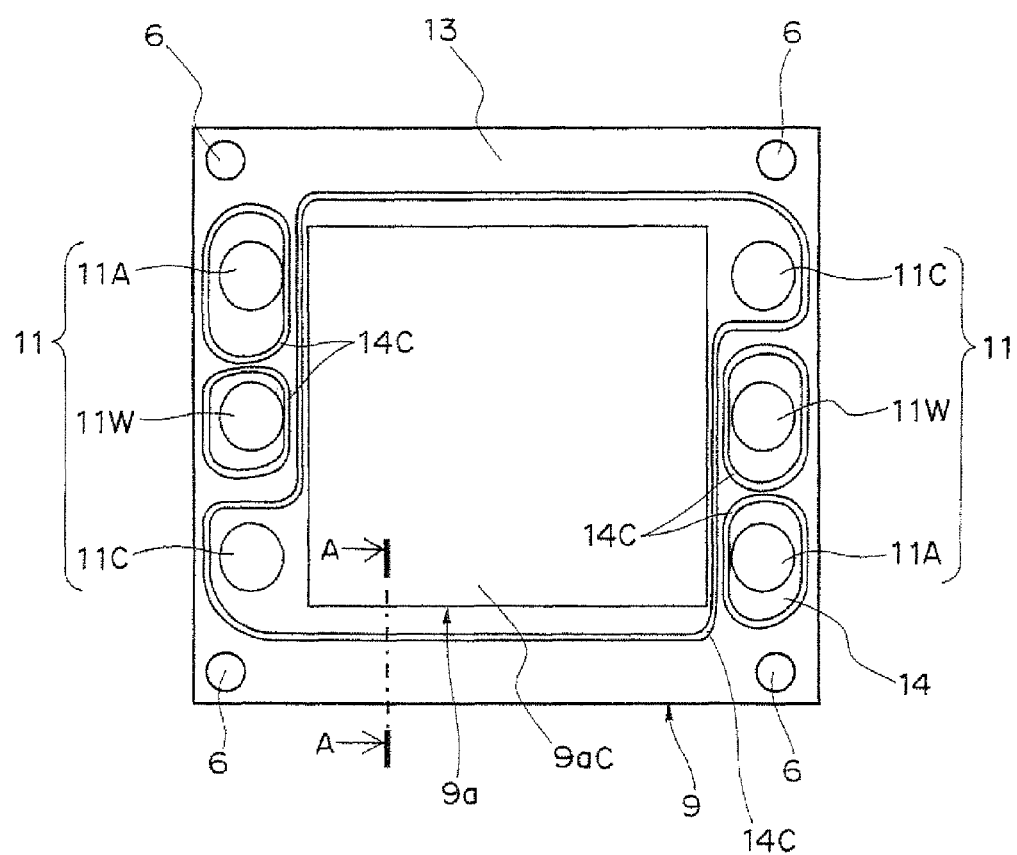
FIG. 2C is a plan view showing the MEA and the gasket structure of the fuel cell stack shown in FIG. 1.

FIG. 2C is a plan view showing the oxidant gas-use gasket structure of the MEA 9 adjacent to the oxidant gas flow channel groove 12C of the separator 10C of the fuel cell stack shown in FIG. 1. The oxidant gas-use gasket 14C is structured to partition such that the space with which the oxidant gas-use manifold hole 11C and the oxidant gas-use body portion 9aC establish communication, the fuel gas-use manifold 11A, and the coolant-use manifold 11W become independent of one another.

Figure 2D:
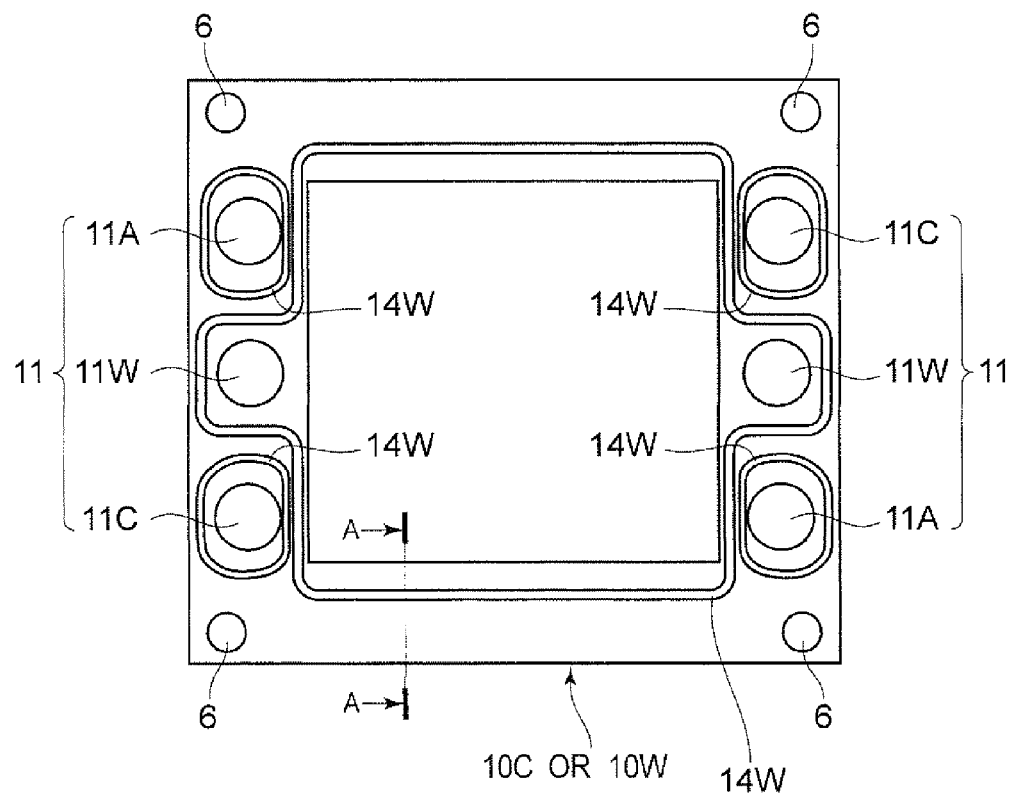
FIG. 2D is a plan view showing the gasket structure of a cathode-side separator or a coolant separator of the fuel cell stack shown in FIG. 1.

FIG. 2D is a plan view showing the coolant-use gasket structure of the cathode-side separator 10C or the coolant separator 10W of the fuel cell stack in FIG. 1. The coolant-use gasket 14W is structured to partition such that the space with which the coolant-use manifold hole 11W and the coolant flow channel groove 12W establish communication, the fuel gas-use manifold 11A, and the oxidant gas-use manifold 11C become independent of one another.

On the back surface (outer surface) of each of the anode-side separator 10A and the cathode-side separator 10C positioned opposite to the MEA 9, a general sealing member (not shown) such as squeeze packing or the like made of a heat-resistant material is arranged around the various manifold holes 11. By the sealing members such as the packing, between adjacent ones of the cells 1, leakage of the fuel gas, the oxidant gas, and the coolant from the connection portion of the various manifold holes 11 between the cells 1 can be prevented.

Figure 3B:
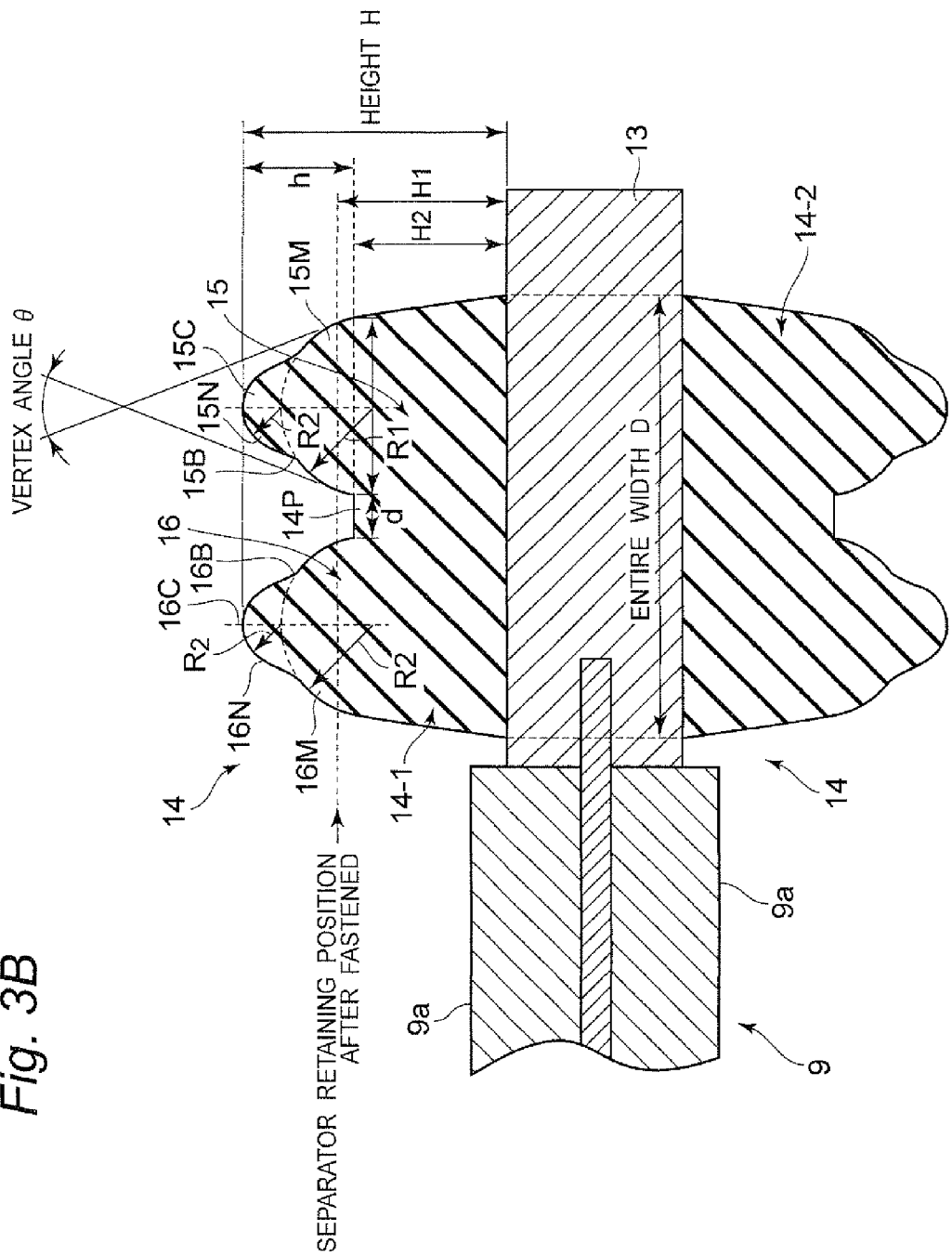
FIG. 3B is a cross-sectional view taken along line A-A in FIG. 2A of the gasket structure of the fuel cell stack according to the first embodiment of the present invention.

Here, FIG. 2A is a plan view of the more specific structure of the MEA 9 of the fuel cell stack 30 according to the first embodiment. A frame body 13 is molded at the external circumference portion of the MEA 9, and the gasket 14 is molded and disposed at the body portion 9a of the MEA 9 and the external circumference of each of the manifold holes 11. FIG. 3B shows a partial cross section taken along A-A of the body portion 9a of the MEA 9, the frame body 13, and the gasket 14. FIG. 3A is a partial cross-sectional view of the gasket structure of the conventional MEA 109 cut along the similar part. FIG. 3B is a partial cross-sectional view of the structure of the gasket 14 according to the first embodiment.

In FIGS. 3A and 3B, the frame body 113, 13 made of resin is molded at the external circumference of the MEA 109, 9. On the top and bottom surfaces of the frame body 113, 13, the gasket 114, 14 are integrally molded. Here, in the conventional example and the first embodiment, a gasket 114-1, 14-1 and a gasket 114-2, 14-2 molded on the top and bottom surface of the frame body 113, 13, respectively, are identical to each other in the cross-sectional shape.

In the first embodiment, the gasket 14-1 and the gasket 14-2 respectively formed on the top and bottom surface of the frame body 13 are identical in the up-and-down direction to each other in the cross-sectional shape. However, the present invention is not limited thereto. For example, depending on the type, temperature, or pressure condition of fluid that flows inside of the top and bottom portions of the MEA 9 in FIG. 3B, it is possible to employ the conventional gasket shape for the top surface, and to employ the shape of the gasket 14 according to the first embodiment for solely the bottom surface. More specifically, for example, in a case where only the coolant flows at the top surface, it is preferable to employ a seal by the conventional gasket 114 for the top surface. In a case where the combustible gas or the oxidant gas flows at the bottom surface, when employing the gasket 14 of the double seal according to the first embodiment, the bottom surface which is more rigorously demanded to exhibit sealing performance than the top surface can exhibit the significant effect of the first embodiment.

Figure 6A:
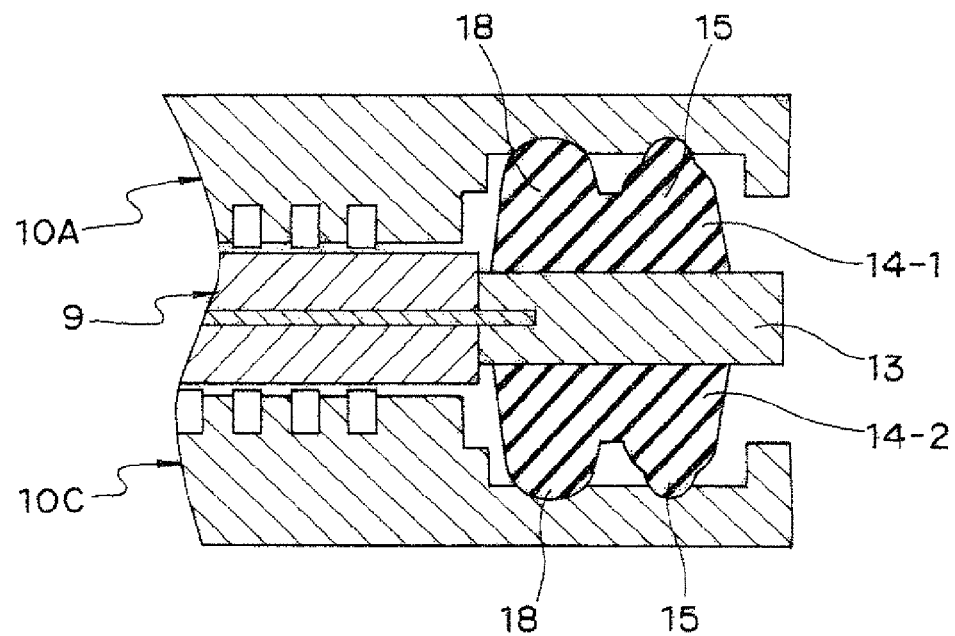
FIG. 6A is a partial cross-sectional view of a gasket structure according to a second embodiment of the present invention, in which the MEA and the separators are virtually assembled.
Figure 7A:
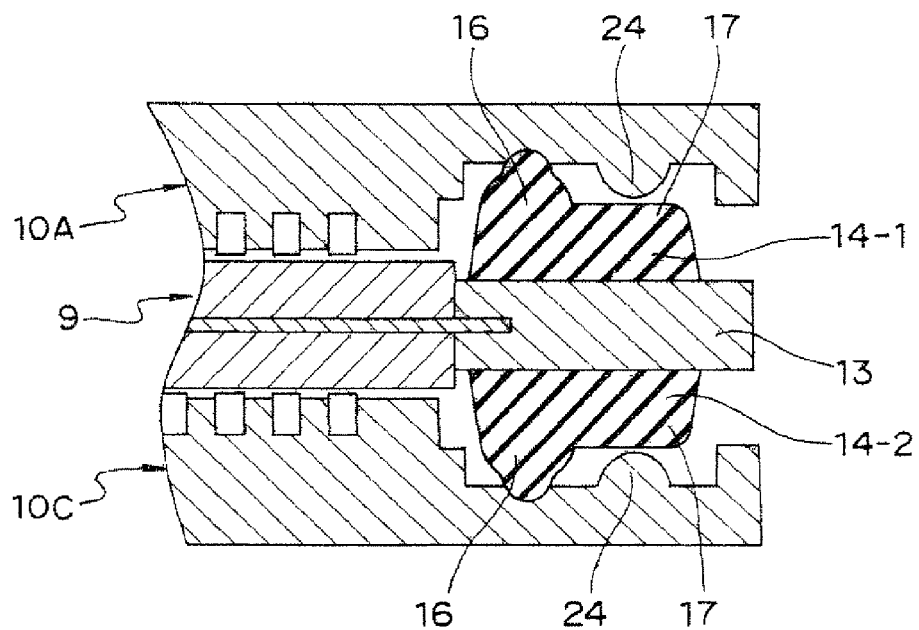
FIG. 7A is a partial cross-sectional view of a gasket structure according to a third embodiment of the present invention, in which the MEA and the separators are virtually assembled.

Further, the effect of the double seal can also be exhibited by disposing gaskets of the double seal of the shapes according to an after-mentioned application example shown in FIGS. 6A and 7A on the top and bottom surfaces, respectively. Further, as one example, fiberglass-added polypropylene can be used as the frame body 13, and one type of olefinic thermoplastic elastomer can be used as the gasket 14. As the gasket material, thermosetting resin is extremely high in flowability when being molded, and the electrode of the MEA 9 is impregnated therewith. Therefore, thermoplastic resin is preferable. Further, using any material which itself has adhesiveness for the frame body 13 and the gasket 14, the sealing performance further increases.

FIG. 3A is a partial cross-sectional view showing the structure of the conventional gasket 114, in which a sealing lip 114a is single-stepped bell-shaped structure.

FIG. 3B is a partial cross-sectional view showing the seal structure according to the first embodiment. Since the top and bottom gaskets 14-1 and 14-2 are identical to each other in shape, in the following, a description will be given of the top gasket 14-1 as a representative example. The gasket 14-1 integrally molded with the frame body 13 is structured with a quadrilateral frame-shaped first sealing lip 15 and a quadrilateral frame-shaped second sealing lip 16 which are continuous to form two rows in parallel to each other in the plane of the MEA 9, and in parallel to each side of the quadrilateral shape being the outer shape of the body portion 9a of the MEA 9. The first sealing lip 15 and the second sealing lip 16 are each structured to be two-stepped bell-shaped in the top to bottom direction (thickness direction) in FIG. 3B.

More specifically, in a cross-sectional view of FIG. 3B, in the gasket 14-1, the first sealing lip 15 disposed on the outside air side (the right side in FIG. 3B) is formed with: a first bottom side bell-shaped portion 15M of the first step raised from the front surface of the frame body 13; a first bottom side apex 15B as an apex of the vertical cross-sectional circular shape of the first bottom side bell-shaped portion 15M; a first top side bell-shaped portion 15N of the second step further raised from nearby the apex 15B of the first bottom side bell-shaped portion 15M; and a first top side apex 15C as an apex of the vertical cross-sectional circular shape of the first top side bell-shaped portion 15N. As seen two-dimensionally, the diameter of the bottom plane portion of the first top side bell-shaped portion 15N is set to be smaller than the diameter nearby the apex 15B of the first bottom side bell-shaped portion 15M, such that the step portion is formed at the connection between the first top side bell-shaped portion 15N and the first bottom side bell-shaped portion 15M. Further, the second sealing lip 16 disposed on the body portion 9a side (the left side in FIG. 3B) of the MEA 9 is similarly formed with: a second bottom side bell-shaped portion 16M of the first step raised from the front surface of the frame body 13; a second bottom side apex 16B as an apex of the second bottom side bell-shaped portion 16M; a second top side bell-shaped portion 16N of the second step further raised from nearby the apex 16B of the second bottom side bell-shaped portion 16M; and a second top side apex 16C as an apex of the second top side bell-shaped portion 16N. As seen two dimensionally, the diameter of the bottom plane portion of the second top side bell-shaped portion 16N is set to be smaller than the diameter nearby the apex 16B of the second bottom side bell-shaped portion 16M, such that the step portion is formed at the connection between the second top side bell-shaped portion 16N and the second bottom side bell-shaped portion 16M.

Further, the bottom portion of the first bottom side bell-shaped portion 15M and the bottom portion of the second bottom side bell-shaped portion 16M are integrated to form a continuing portion 14P, such that the portion between the first and second sealing lips 15 and 16 attains a continuous shape. A height H2 of the continuing portion 14P between the first and second sealing lips 15 and 16 is set to be lower than a height H1 which is from the frame body 13 to the separator retaining position after the stack is assembled. By establishing the relationship of H1>H2 in this manner, a reduction in the reaction force is realized, and the double seal can be molded in a narrow range. In other words, conversely, by setting the height H2 of the continuing portion 14P to be as high as or higher than the height H1 which is from the frame body 13 to the separator retaining position after the stack is assembled, it necessitates elastic deformation of the first and second sealing lips 15 and 16 and the continuing portion 14P to the height H1 of the separator retaining position. This increases the reaction force, and turns the double seal into a single seal. In such a case, in order to surely obtain the double seal, it requires an increase in the distance between the first and second sealing lips 15 and 16, and it becomes impossible to mold the double seal in a narrow range. It is to be noted that, the height of each of the first bottom side apex 15B, the first top side apex 15C, the second bottom side apex 16B, and the second top side apex 16C is set to be higher than the height H1 which is to the separator retaining position after the stack is assembled, such that the stack surely elastically deforms when assembled.

Figure 10A:
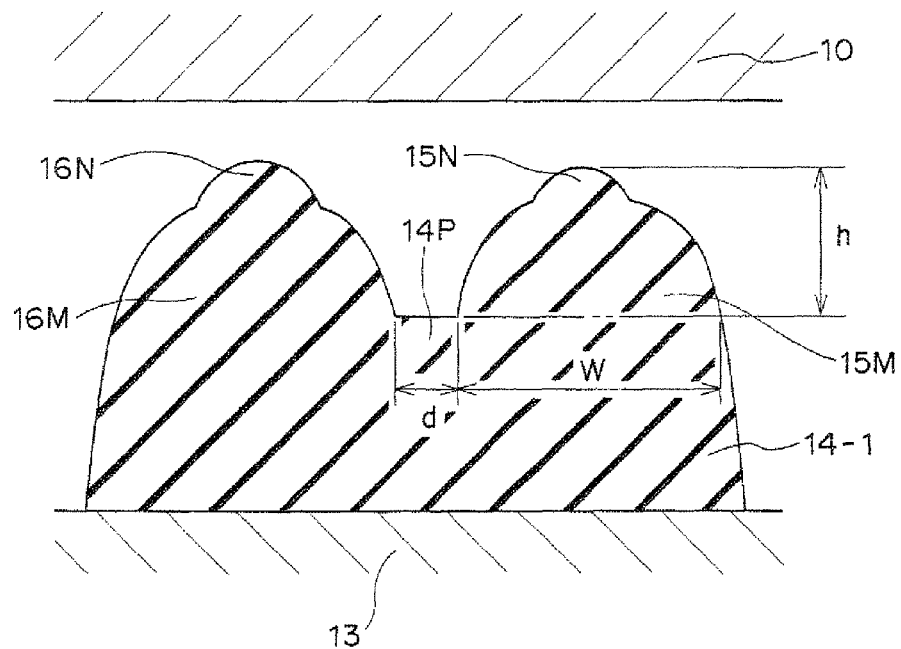
FIG. 10A is a partial enlarged cross-sectional view of the gasket structure of the fuel cell stack according to the first embodiment shown in FIG. 3B.
Figure 10B:
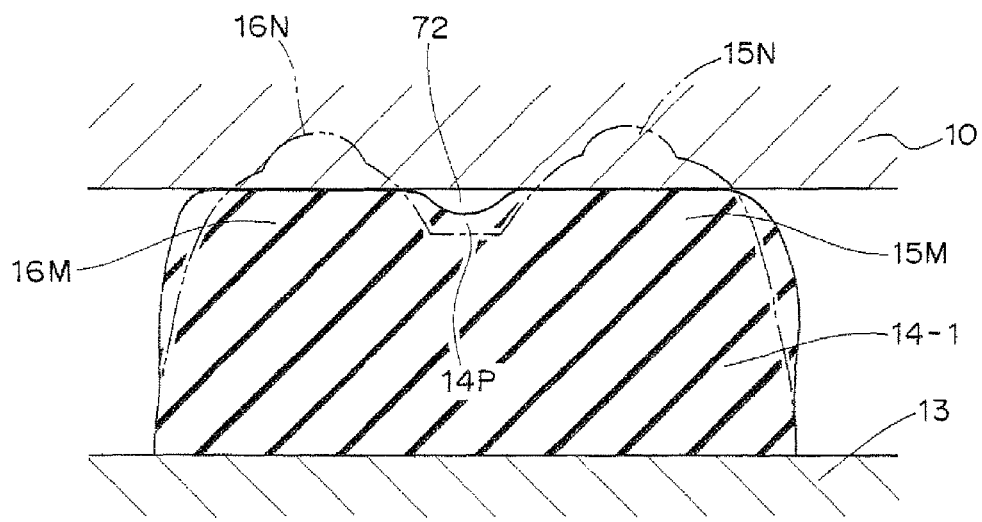
FIG. 10B is an enlarged cross-sectional view in a state where the gaskets shown in FIG. 10A are pressed by the separators.

FIG. 10A is a partial enlarged cross-sectional view of the gasket structure of the fuel cell stack according to the first embodiment shown in FIG. 3B. FIG. 10B is an enlarged cross-sectional view of the gasket shown in FIG. 10A being pressed by the separator. Here, it is preferable that the following relationship is satisfied: W>h>0 and W>d>0, where: a width of the bottom plane of each of the bottom side bell-shaped portions 15M and 16M is W; a width of the continuing portion 14P is d; a height from the bottom plane of the bottom side bell-shaped portions 15M and 16M to the apex portions 15C and 16C of the top side bell-shaped portions 15N and 16N is h. The reasons are stated as follows.

First, the reason why W>h>0 is preferable is that it is advantageous for the stability of the sealing lips 15 and 16. When the height h is greater than the width W, the sealing lips 15 and 16 are prone to be unstable.

Next, the reason why W>d is preferable is that, when the width d is excessively great, the entire size increases and a space volume of a concave portion 72 formed at the continuing portion 14P between the two sealing lips 15 and 16 becomes great when the sealing lips 15 and 16 are compressed. When the space volume of the concave portion 72 becomes great, in a case where the temperature of the moisture entered the space at the concave portion 72 and drops to enter a frozen state, the volume of water increases when the water freezes. For example, as shown in FIG. 4A, with the double seal structure in connection with the MEA employing the conventional gasket and the paired separators, the entire size further increases; the interval formed in the double seal structure further increases; and the space volume of the concave portion 72 further increases. Then, when the temperature of the moisture entered the space of the concave portion 72 drops to enter the frozen state, the volume of water further increases when the water freezes. Here, since the separator 10 at each of the top and bottom of the sealing lips 15 and 16 shown in FIG. 10A is greater in strength than the seal material, the force generated in accordance with an increase in the volume of moisture (water) acts on the sealing lips 15 and 16 than on each separator 10, to push the sealing lips 15 and 16 in right and left directions in FIG. 10B, making the sealing lips 15 and 16 prone to collapse. When the sealing lips 15 and 16 collapse, such an event invites occurrence of leakage. Accordingly, in order to surely prevent such leakage, the dimension must be set such that the volume of the space at the concave portion 72 is minimized. To this end, the relationship W>d must be satisfied.

Further, the reason why d>0 is preferable is that, in a case where no space at the concave portion 72 is left when the sealing lips 15 and 16 are compressed, the two sealing lips 15 and 16 push each other when the sealing lips 15 and 16 are compressed, making the sealing lips 15 and 16 prone to collapse. Therefore, it is not preferable. In order to prevent such a situation, the width d must at least assume a positive value.

For the reasons stated above, it is preferable that the relationships W>h>0 and W>d>0 are satisfied.

Further, a description will be given of the reason why the sealing lips 15 and 16 are effective when they each are a two-stepped lip (two-stepped bell-shaped structure) structured with the bottom side bell-shaped portions 15M and 16M and the top side bell-shaped portions 15N and 16N, for the purpose of securing a prescribed sealing resistance to pressure while reducing the fastening pressure.

Figure 11A:
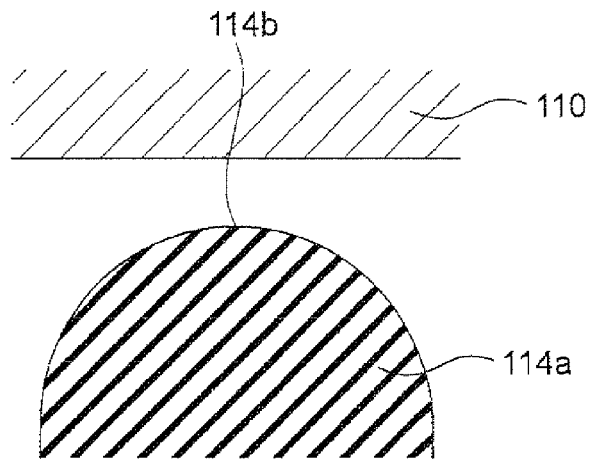
FIG. 11A is an enlarged cross-sectional view in a state immediately before the conventional single-stepped lip gasket is pressed by the separator.
Figure 11B:
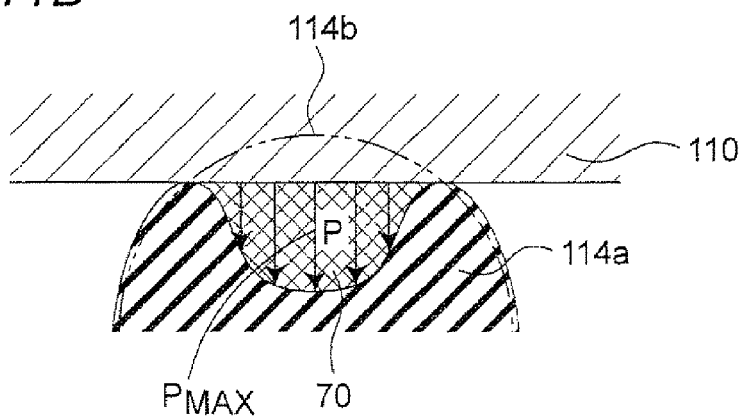
FIG. 11B is an enlarged cross-sectional view in a state where the conventional single-stepped lip gasket is pressed by the separator.

First, for the purpose of comparison, as shown in FIGS. 11A and 11B, in a case with the conventional single-stepped lip (single-stepped bell-shaped structure), when a head portion 114b of the single-stepped bell-shaped portion 114a contacts the separator 110, the head portion 114b of the single-stepped bell-shaped portion 114a is crushed and compressed by elastic deformation. Defining that the force received from the separator 110 is P, the fastening pressure at a portion 70 resulted by the crushing and compression of the head portion 114b of the single-stepped bell-shaped portion 114a is represented by $\Sigma P$, and is determined by the area of the compressed portion 70 (see the cross-hatched portion).

Figure 11C:
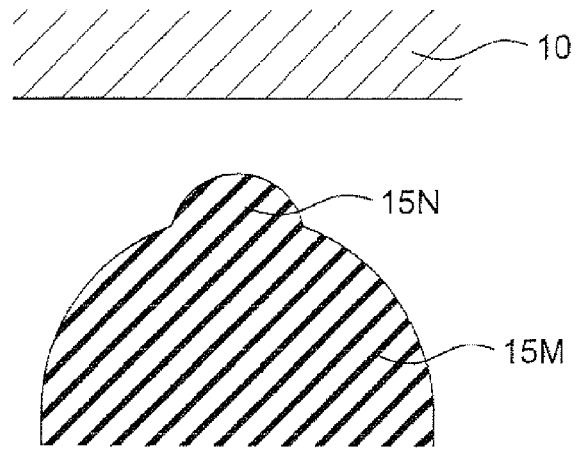
FIG. 11C is an enlarged cross-sectional view in a state immediately before the two-stepped sealing lip gasket according to the first embodiment is pressed by the separator.
Figure 11D:
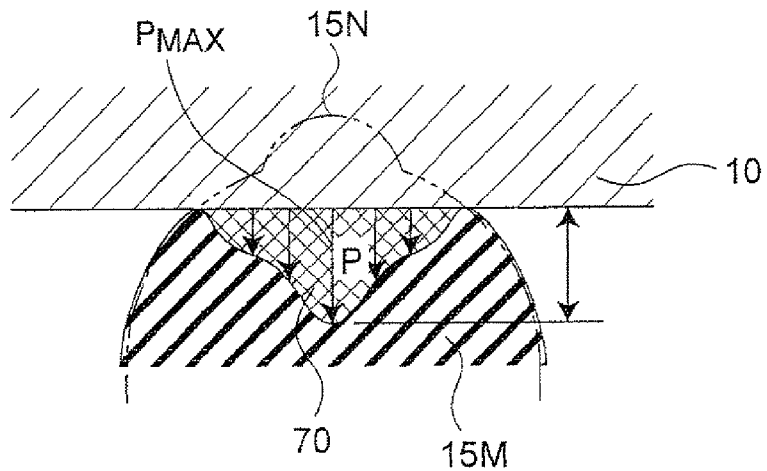
FIG. 11D is an enlarged cross-sectional view in a state where the two-stepped sealing lip gasket according to the first embodiment is pressed by the separator.
Figure 11E:
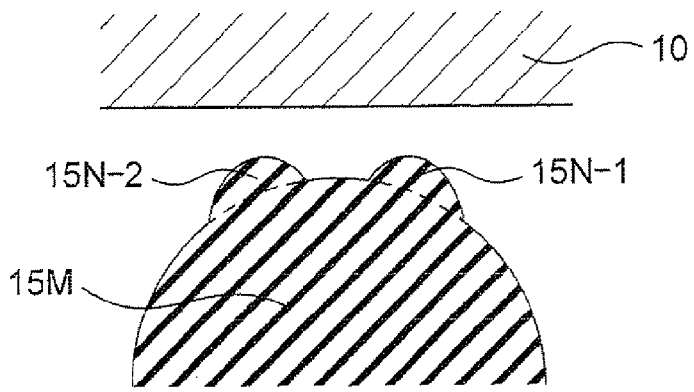
FIG. 11E is an enlarged cross-sectional view in a state immediately before a two-stepped sealing lip gasket according to a variation example of the first embodiment is pressed by the separator.

On the other hand, as shown in FIGS. 11C and 11D, in a case with the two-stepped lip (two-stepped bell-shaped structure) as in the first embodiment, when the entire top side bell-shaped portions 15N and 16N and part of the bottom side bell-shaped portions 15M and 16M contact the separator 10, the entire top side bell-shaped portions 15N and 16N and part of the bottom side bell-shaped portions 15M and 16M are crushed and compressed by elastic deformation. Defining that the force received from the separator 10 is P, the fastening pressure at a portion 71 resulted by the crushing and compression is represented by $\Sigma P$, and is determined by the area of the compressed portion 71 (see the cross-hatched portion). At this time, the sealing resistance to pressure of the sealing lips 15 and 16 is determined by the peak surface pressure $P_{MAX}$. When the peak surface pressure $P_{MAX}$ is higher than the gas pressure, sealing can be achieved.

Here, as is apparent from the comparison between FIGS. 11B and 11D, the fastening pressure represented by the area of the cross-hatched portion is smaller in FIG. 11D of the first embodiment than in FIG. 11B of the conventional example. Thus, it can clearly be seen that the fastening pressure is reduced. Further, the peak surface pressure $P_{MAX}$ is substantially the same in FIGS. 11B and 11D.

Further, a double-bell type (i.e., a structure being two-stepped bell-shaped structure and including a plurality of top-side bell-shaped portions) as a variation example of the two-stepped lip as in the present embodiment has a plurality of top side bell-shaped portions 15N-1 and 15N-2 of the second step, which are further raised from nearby the apex 15B of the bottom side bell-shaped portion 15M. Though not specifically shown in the drawings, the other sealing lip 16 can be included in the similar manner. With such a structure, in the sealing lip 15, when the entire top side bell-shaped portions 15N-1 and 15N-2 and part of the bottom side bell-shaped portion 15M contact on the separator 10, the entire top side bell-shaped portions 15N-1 and 15N-2 and part of the bottom side bell-shaped portion 15M are crushed and compressed by elastic deformation. Defining the force received from the separator 10 is P, the fastening pressure at a portion 73 resulted by the crushing and compression is represented by ΣP, and is determined by the area of the compressed portion 73 (see the cross-hatched portion).

Figure 11F:
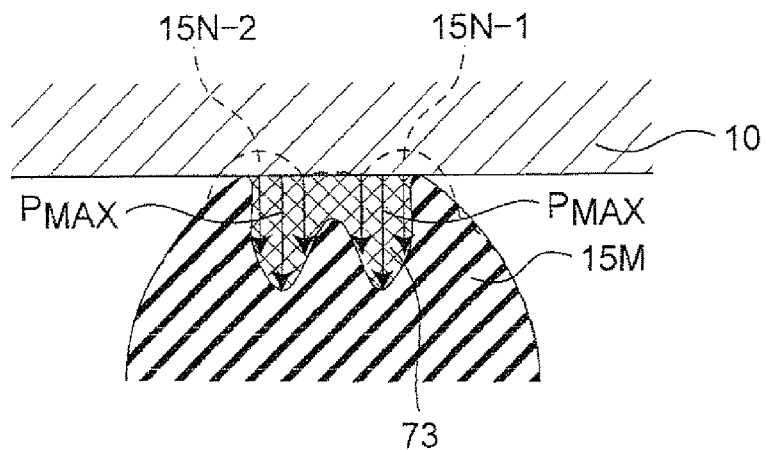
FIG. 11F is an enlarged cross-sectional view in a state where the two-stepped sealing lip gasket according to its variation example of the first embodiment is pressed by the separator.

At this time, as to the maximum value of the sealing resistance to pressure, at each of the two places where the top side bell-shaped portions 15N-1 and 15N-2 are compressed, the peak surface pressure $P_{MAX}$ higher than the gas pressure is produced. As a result, the peak surface pressure $P_{MAX}$ can be produced at two places, whereby the sealing function can more stably be exhibited. Further, the peak surface pressure P at each of the two places shown in FIG. 11F are substantially the same as in FIGS. 11B and 11D.

In the first embodiment, the first sealing lip 15 and the second sealing lip 16 are mirror symmetric as to the entire top side bell-shaped portions 15N and 16N and part of the bottom side bell-shaped portions 15M and 16M. The first bottom side apex 15B and the second bottom side apex 16B are identical to each other in the radius of curvature of the apex, and the first top side apex 15C and the second top side apex 16C are identical to each other in the radius of curvature of the apex. However, as will be described later, the present invention is not limited thereto. The first top side apex 15C and the second top side apex 16C may be different in the radius of curvature. In consideration of a further ensured achievement of the effect of the present invention, the following correlation is preferably satisfied: $R_1 \times 0.5 \geq R_2$, where the radius of curvature for each of the first bottom side apex 15B and the second bottom side apex 16B is $R_1$, and the radius of curvature for each of the first top side apex 15C and the second top side apex 16C is $R_2$. Here, as one example, the radius of curvature $R_2$ is desirably 0.2 to 0.6 mm. In the first embodiment, 0.3 mm may be employed as the radius of curvature $R_2$. By structuring each of the first and second sealing lips 15 and 16 as the two-stepped bell-shaped portion, and setting the radius of curvatures $R_1$ and $R_2$ of the apexes of the two-stepped bell-shaped portion to satisfy $R_1 \times 0.5 \geq R_2$, elastic deformation takes place at two places of the first top side apex 15C and the second top side apex 16C of their respective first and second sealing lips 15 and 16, whereby sealing is performed in a centered manner to the separator 10A or 10C (in other words, the sealing performance is improved in a centered manner on the center line passing through the apex of the first top side apex 15C in the cross section). Thus, it becomes possible to surely secure the double sealing performance with a small reaction force. In particular, by setting the radius of curvature $R_2$ of the apex to satisfy $R_1 \times 0.5 \geq R_2$, it becomes possible to stably mold the shape of the gasket 14. Furthermore, when the stack is assembled, it becomes possible to fasten the gasket 14 stably, to thereby ensure the sealing performance. That is, this is because of the following which would occur when the radius of curvature $R_2$ of the apex is smaller than $R_1 \times 0.5$: moldability becomes poor (such as an occurrence of shortage (insufficient filling with a molding resin)); the seal may twist when the stack is fastened; or load may not evenly be put. Further, in the first embodiment, the apex shape of the first sealing lip 15 and that of the second sealing lip 16 are set to be identical to each other. However, so long as the above-stated correlation is satisfied, the foregoing effect can be exhibited even the first sealing lip 15 and the second sealing lip 16 are different from each other in the shape of the apex.

Further, in the first embodiment, the center position of the radius of curvature $R_1$ of each of the bottom-side apexes 15B and 16B of their respective bottom side bell-shaped portions 15M and 16M and the center position of the radius of curvature $R_2$ of each of the top-side apexes 15C and 16C of the top side bell-shaped portions 15N and 16N are aligned on one line. However, depending on the internal or external environment of the MEA 9 or the pressure load situation of gas or water supplied to the MEA 9, the center position of the radius of curvature $R_2$ of the top-side apexes 15C and 16C can be shifted, with reference to the center position of the radius of curvature $R_1$ of the bottom-side apexes 15B and 16B, toward the MEA 9 side or toward the outside air side, within a range where the radius of curvature $R_1$ of the bottom-side apexes 15B and 16B and the end portion of the radius of curvature $R_2$ of the top-side apexes 15C and 16C match with each other. In particular, in a case where the internal pressure of gas or water supplied to the MEA 9 is great, by shifting the center of the radius of curvature $R_2$ of the top-side apexes 15C and 16C of the second sealing lip 16 toward the MEA 9 side, or by setting the radius of curvature $R_2$ of the top-side apexes 15C and 16C to a greater value within the above-stated range (e.g., $(R_1 \times 0.5 \geq R_2)$, with the radius of curvature $R_2$ approximating the maximum value), displacement of the top-side apex 16C of the second sealing lip 16 by the internal pressure is eliminated. Thus, it is effective in improving the sealing performance when loaded with the internal pressure.

In order to surely prevent the first and second sealing lips 15 and 16 from collapsing when the stack is assembled, and to surely improve the stability, it is desirable that a vertex angle θ of each of the first and second sealing lips 15 and 16 is equal to or more than 18°. From the viewpoint of surely achieving a reduction in the fastening force and preventing a reduction in the surface pressure peak value of the gasket body, the upper limit value of the vertex angle θ is 90 degrees.

Further, a ratio (H/D) of a total height of the first and second sealing lips 15 and 16 (the dimension from the front surface of the frame body 13 to the apex of the second sealing lip 16 in the thickness direction) H and an entire width D (sum of the width of both the first and second sealing lips 15 and 16 (the dimension from the outer edge of the first sealing lip 15 to the inner edge of the second sealing lip 16)) is desirably H/D≤0.6. In other words, with reference to the entire width D perpendicular to the thickness direction of the two sealing lips and along the direction perpendicular to the extending direction of the two rows of the sealing lips, the dimension H in the thickness direction from the front surface of the external circumference of the membrane electrode assembly to the apex of the top side bell-shaped portion is desirably equal to or less than 60%. The lower limit value of the ratio (H/D) is 0.1. When the lower limit value of the ratio (H/D) is less than 0.1, the sealing effect cannot be improved while the amount of the material to be used increases.

The optimum entire width D is 0.5 to 5.0 mm. It is to be noted that, here, the width refers to a dimension perpendicular to the thickness direction of the sealing lips, and that is along a direction perpendicular to the extending direction of the sealing lips. Here, as one practical example, what can be employed are: vertex angle θ=18°; and H/D=0.6 as the ratio (H/D) between the height H and the entire width D. In a case where the vertex angle θ is smaller than 18°, or when the ratio (H/D) between the height H and the entire width D of the first and second sealing lips 15 and 16 is greater than 0.6, the apexes of the first and second sealing lips 15 and 16 become unstable and may collapse sideways when applied with fastening load when the stack is assembled. Occurrence of such a sideways collapse prevents the sealing performance from being exhibited. For the purpose of surely achieving a reduction in both the size of the stack 30 and the thickness of the unit cell module 1 also, it is desirable that the first and second sealing lips 15 and 16 have the smallest height and the narrowest possible entire width D with which the sealing performance can be exhibited. Therefore, as described above, it is preferable that H/D 0.6 is satisfied.

In the first embodiment of the present invention, the first and second sealing lips 15 and 16 are structured to be two-stepped, and the top side bell-shaped portions 15N and 16N of the second step, which are two-dimensionally smaller than the bottom side bell-shaped portions 15M and 16M of the first step and each of which have a small radius of curvature in terms of cross section, are disposed on the bottom side bell-shaped portions 15M and 16M. With such a structure, when the stack is assembled, firstly the top side bell-shaped portions 15N and 16N are brought into contact with the separators 10A and 10C, whereby the top side bell-shaped portions 15N and 16N function as deformation facilitated portions that can elastically deform with ease to a greater extent than the bottom side bell-shaped portions 15M and 16M do. After the top side bell-shaped portions 15N and 16N elastically deform greatly as the deformation facilitated portions, the apex portions of the bottom side bell-shaped portions 15M and 16M deform, and the bottom side bell-shaped portions 15M and 16M function as seal area enlarging portions that enlarge the seal area between the separators 10A and 10C. As a result, the apexes of the first and second sealing lips 15 and 16 are stably brought into contact with the opposite face of the separator 10A or 10C when the fastening load is applied when the stack is assembled, to start elastically deform. Thus, the sideways collapse of the first and second sealing lips 15 and 16 can surely be prevented, and the sealing performance can surely be exhibited. Hence, a reduction in both the size of the stack 30 and the thickness of the unit cell module 1 can surely be achieved. Further, the first and second sealing lips 15 and 16 are brought into contact with the opposite face of the separator 10A or 10C to exhibit the sealing performance, whereby double sealing can be achieved, and it becomes possible to provide a double seal structure which can surely secure the sealing performance. Hence, since the sealing performance improves as compared to the conventional example, it becomes possible to achieve the effect of reduced seal height and also the reduced reaction force as compared to the conventional example. Further, when a material having no adhesiveness is used for each of the frame body 13 and the gasket 14, setting a great value for the entire width D or increasing the surface roughness of the surface of a portion of the frame body 13 where the gasket 14 is to be formed can contribute toward improving the sealing performance. The gasket 14 can be formed with a resin material such as synthetic rubber, EPDM, silicone, or the like.

Next, a description will be given of the gasket 14 of the shape of the first embodiment, comparing against the gasket 114 of the conventional shape.

Figure 4B:
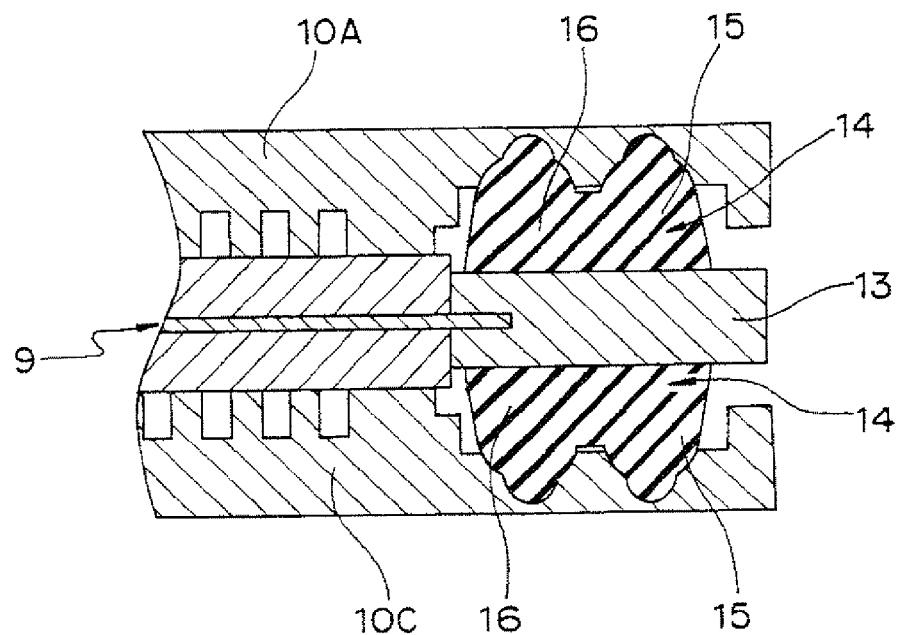
FIG. 4B is a partial cross-sectional view of the double seal structure with respect to the MEA and to the paired separators using the gaskets of the fuel cell stack according to the first embodiment (a partial cross-sectional view of the double seal structure taken along line A-A in FIG. 2A), in which the gaskets and the separators are virtually assembled.

FIG. 4A is a partial cross-sectional view of the unit cell module 1 in a case where the double seal is structured by juxtaposing the two gaskets 114 of the conventional shape so as to contact the separators 110. FIG. 4B is a partial cross-sectional view of the unit cell module 1 with the gaskets 14 of the shape according to the first embodiment. It is to be noted that, FIGS. 4A and 4B each show the separator shape such that the seal groove shape of the separators can clearly be seen, and do not show the cross section when fastened. They each show the state where the gaskets 114 and the separators 110 are virtually assembled and, therefore, each seal does not elastically deform at all.

Figure 4C:
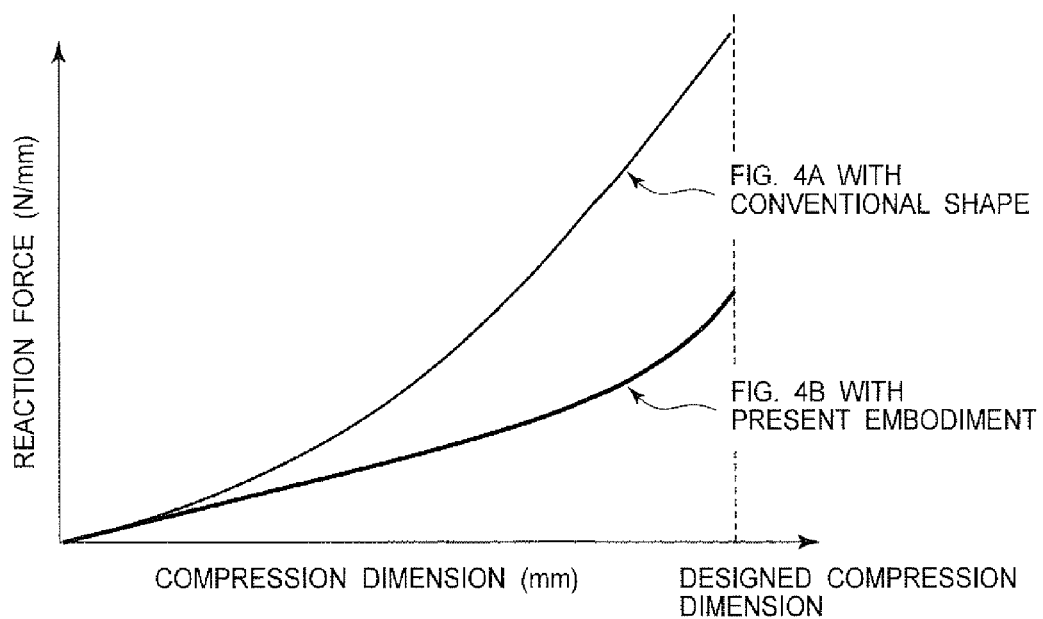
FIG. 4C is a graph showing a comparison between the seal reaction force with the gasket structure of the conventional example and the seal reaction force with the gasket structure according to the first embodiment of the present invention.

FIG. 4C is a graph showing a simulation result obtained by comparing the seal reaction force which is produced when the double seal is structured with the conventional gasket shape shown in FIG. 4A, and the seal reaction force which is produced with the gasket shape according to the first embodiment of the present invention shown in FIG. 4B. The simulation was carried out with the general-purpose structural analysis software ABAQUS. With the shape of the gaskets 14 of the first embodiment of the present invention, the reaction force is reduced by up to about 40% as compared to the conventional example, and a reduction in the fastening pressure to the stack 30 can be possible. Further, a result similar to the simulation was obtained by an experiment.

Figure 4D:
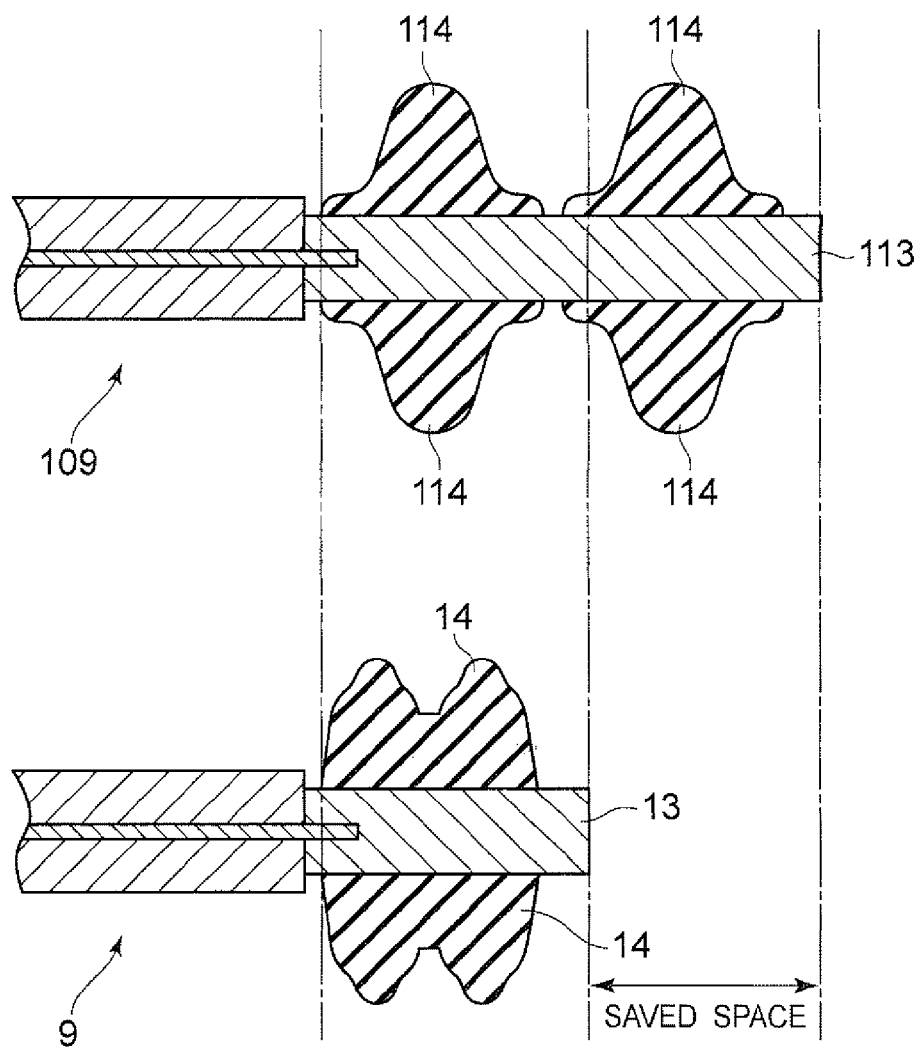
FIG. 4D is a partial cross-sectional explanatory view showing a comparison in terms of dimension between the gasket structure of the conventional example and the gasket structure according to the first embodiment.

Further, as shown in FIG. 4D, the shape of each gasket 14 of the first embodiment of the present invention requires a smaller occupying area of the gasket 14 in the unit cell module 1, as compared to the double seal structure which is structured by juxtaposing two gaskets 114 of the shape of the conventional example. Therefore, it becomes possible to save the space, and a reduction in size of the stack 30 can be achieved.

Figure 4E:
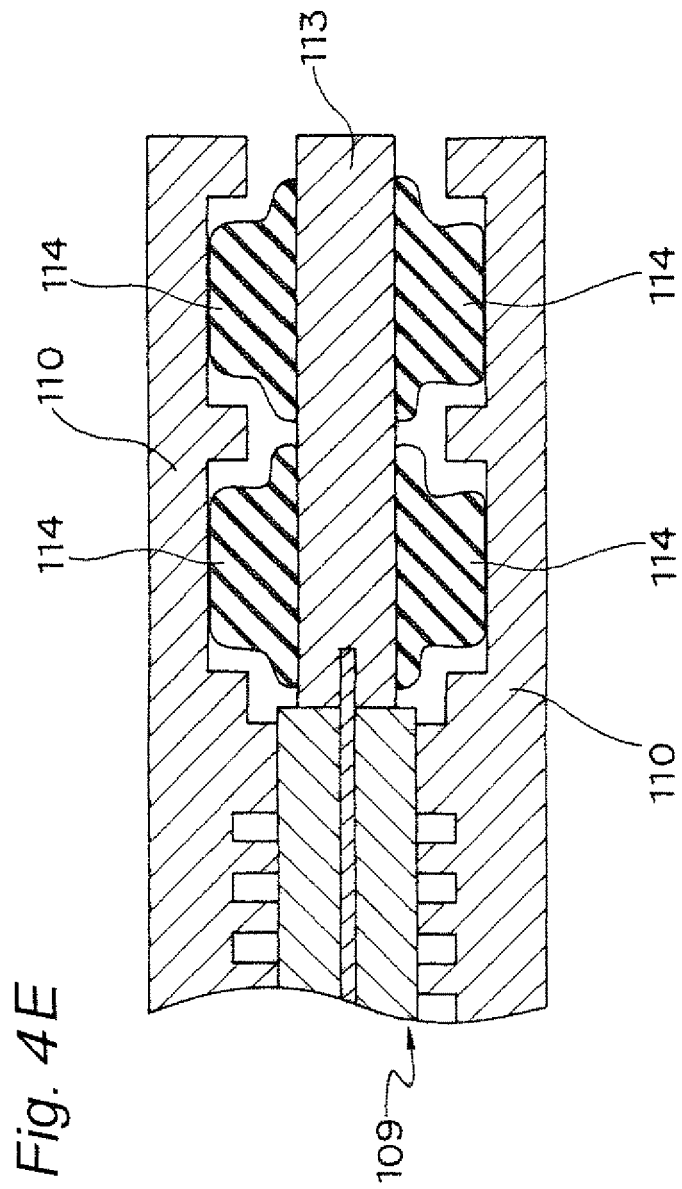
FIG. 4E is a partial cross-sectional view of the double seal structure of the MEA and the paired separators using the gasket of the conventional example when fastened (a partial cross-sectional view of the double seal structure according to the conventional example taken along a similar portion as line A-A in FIG. 2A)

FIG. 4E is a partial cross-sectional view of the fastened unit cell module 1 in which the two gaskets 114 of the conventional shape shown in FIG. 4A are juxtaposed to each other and disposed so as to be brought into contact with the separators 110 to structure the double seal, in which each seal elastically deforms.

Figure 4F:
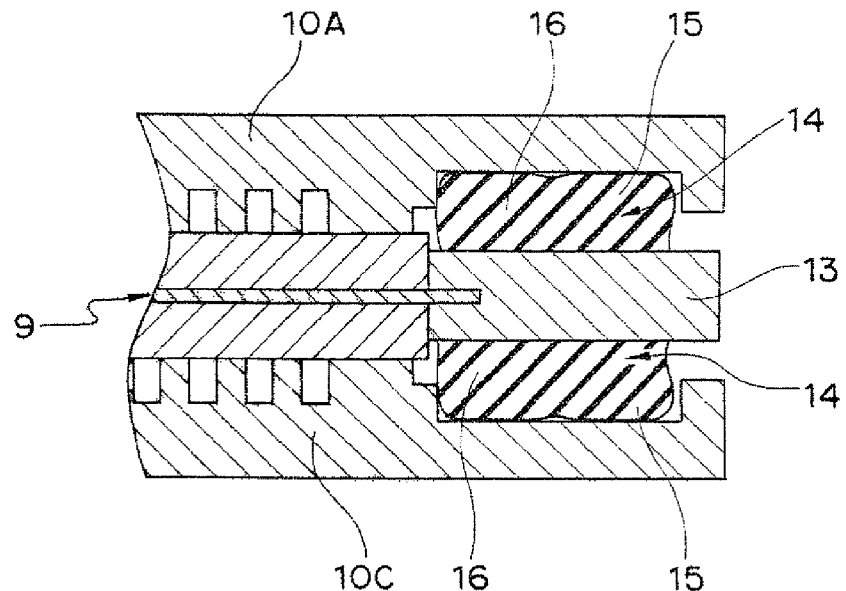
FIG. 4F is a partial cross-sectional view of the double seal structure of the MEA and the paired separators using the gaskets of the fuel cell stack according to the first embodiment when fastened (a partial cross-sectional view of the double seal structure taken along line A-A in FIG. 2A)

FIG. 4F is a partial cross-sectional view of the fastened unit cell module 1 with the gaskets 14 of the shape of the first embodiment shown in FIG. 4B, in which each seal elastically deforms.

Figure 5A:
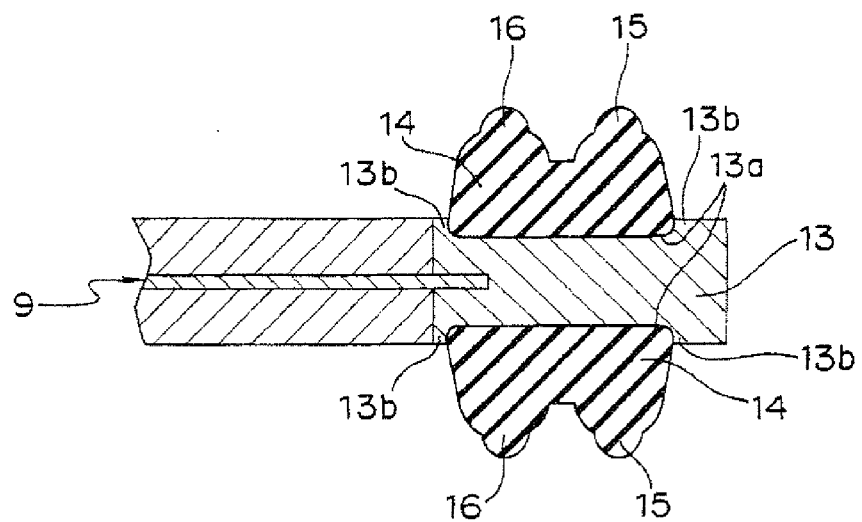
FIG. 5A is a partial cross-sectional view showing a variation example of the first embodiment.
Figure 5B:
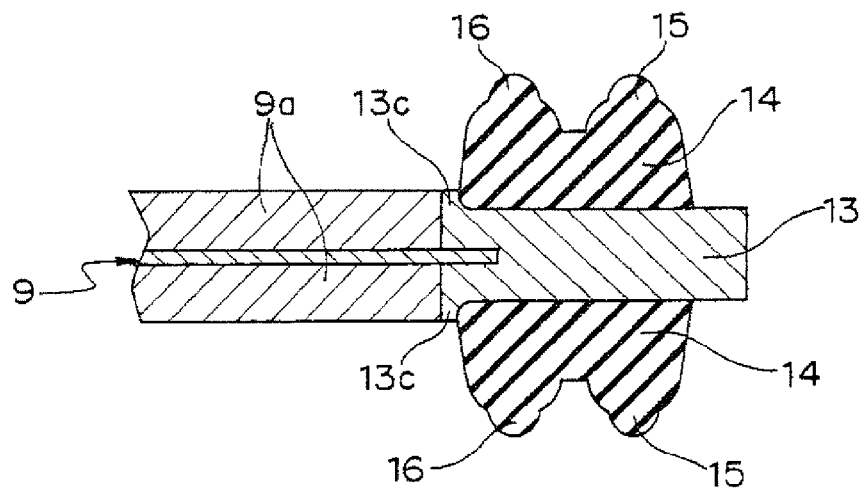
FIG. 5B is a partial cross-sectional view showing another variation example of the gasket according to the first embodiment.

FIGS. 5A and 5B each show a variation example of the first embodiment. FIG. 5A shows the structure in which the bottom surface of each gasket 14 is buried on the frame body 13 side. In other words, a concave portion 13a is previously formed on each surface of the frame body 13 where each gasket 14 is to be disposed, and the gasket 14 is fitted in the concave portion 13a. By forming the gasket 14 to be buried in the frame body 13, it becomes possible to surround the gasket 14 with the edge portion 13b of the concave portion 13a. Thus, the frame body 13 can stop the gasket 14 from spreading in the plane direction at the edge portion 13b when the gasket 14 is fastened. Therefore, the sealing performance further improves. Further, as shown in FIG. 5B, with the shape in which only one side of each of the first and second sealing lips 15 and 16 is buried in the frame body 13 also (in other words, in FIG. 5B, just the body portion 9a side of the MEA 9 of the first sealing lip 15 is supported by a raised portion 13c of the frame body 13), the similar effect of the improvement in the sealing performance can be exhibited.

It is to be noted that, the present invention is not limited to the embodiment described above, and can be practiced in various other aspects as illustrated in the following.

Second Embodiment

Figure 6B:
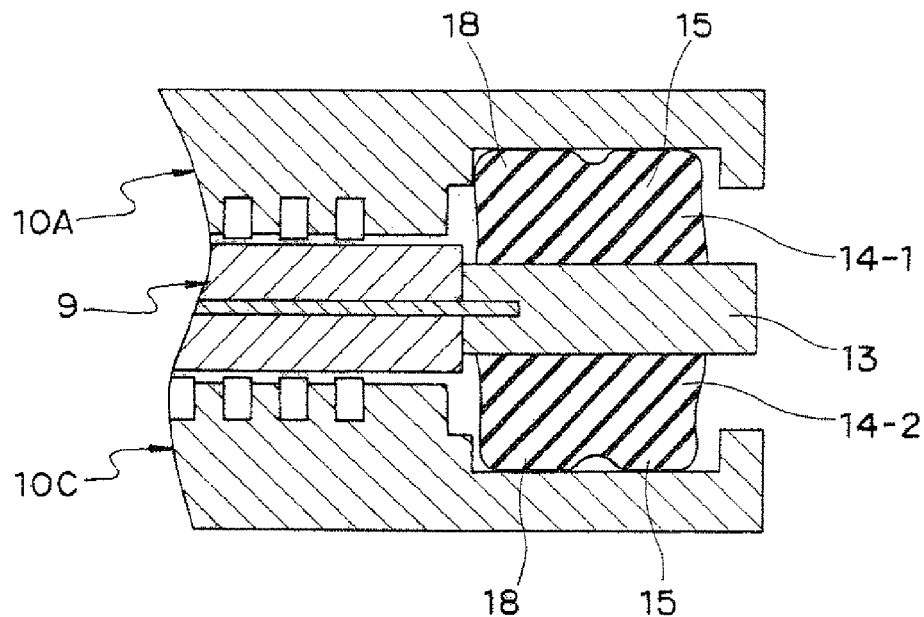
FIG. 6B is a partial cross-sectional view of the gasket structure according to the second embodiment of the present invention when fastened.

FIG. 6A shows a partial cross-sectional view of a seal structure according to a second embodiment of the present invention. While the first sealing lip 15 on the outside air side has the two-stepped lip structure which is identical to that in the first embodiment, a third sealing lip 18 on the MEA side has the single-stepped lip structure. The third sealing lip 18 may be bell-shaped with one apex in the vertical cross-sectional circular shape, instead of being the two-stepped bell-shaped. In this manner, in a situation where the inside and the outside are differing in environment from each other, by employing the sealing lip shape suitable for the corresponding environment, depending on the operation condition or the environmental condition, it becomes possible to achieve the effect of a further improvement in the sealing performance for a long period in addition to the effect of the first embodiment. This is described in the following. It is to be noted that, FIG. 6A shows the separator shape such that the seal groove shape of the separators can clearly be seen, and does not show the cross section when fastened. FIG. 7A shows the state where the MEA and the separators are virtually assembled and, therefore, each seal does not elastically deform at all. In contrast thereto, FIG. 6B is a partial cross-sectional view of the fastened gasket structure according to the second embodiment, in which each seal elastically deforms.

Inside of the unit cell module 1 of the fuel cell stack 30 is in an atmosphere of water vapor, water, hydrogen, and oxygen. While an internal pressure of up to several hundreds of MPa is applied to the sealing lip disposed on the MEA side, since the outside air is an air atmosphere, no pressure is loaded onto the sealing lip disposed on the outside air side. In a case where the double seal structure according to the first embodiment is employed, the sealing lip that is in the unit cell module 1 and that is in contact with the MEA 9 must have combined features of water resistance, water vapor resistance, and pressure resistance, and the sealing lip in contact with the outside air must retain durability against the air. As the sealing lip on the MEA 9 side, when disposing the third sealing lip 18 in place of the second sealing lip 16 according to the first embodiment, the contact area of the third sealing lip 18 relative to the separator 10A or 10C is enlarged than that of the second sealing lip 16. Accordingly, even in a case where the internal pressure of the fuel gas and the oxidant gas is loaded, it becomes possible to achieve a structure with a great pressure resistance, and to further secure the sealing performance more surely for a longer period. Still further, it becomes possible to achieve a structure with further higher resistance to water vapor and also to a water environment. That is, when an internal pressure on the MEA side is applied extremely greatly, when employing the shape of the third sealing lip 18, a further improvement in the sealing performance for a long period can be achieved. Further, since the temperature of the unit cell module 1 rises to about 80° C. while the fuel cell stack 30 is in operation, particularly the sealing lip on the MEA 9 side is required to have heat resistance also. In the second embodiment, thermoplastic elastomer having heat resistance can be used as the material of the gasket 14.

It is to be noted that, depending on the material or the internal or the external environment (e.g., in a case where a pressure is not loaded onto the seal on the MEA side, and the outside air side seal is placed under a low temperature), even when employing the two-stepped sealing lip structure on the inner side (the MEA side) and the single-stepped sealing lip structure on the outer side (the outside air side) conversely to the disposition shown in FIG. 6A, the effect of improving the sealing performance and retaining the sealing performance for a long period can also be exhibited.

Third Embodiment

Figure 7B:
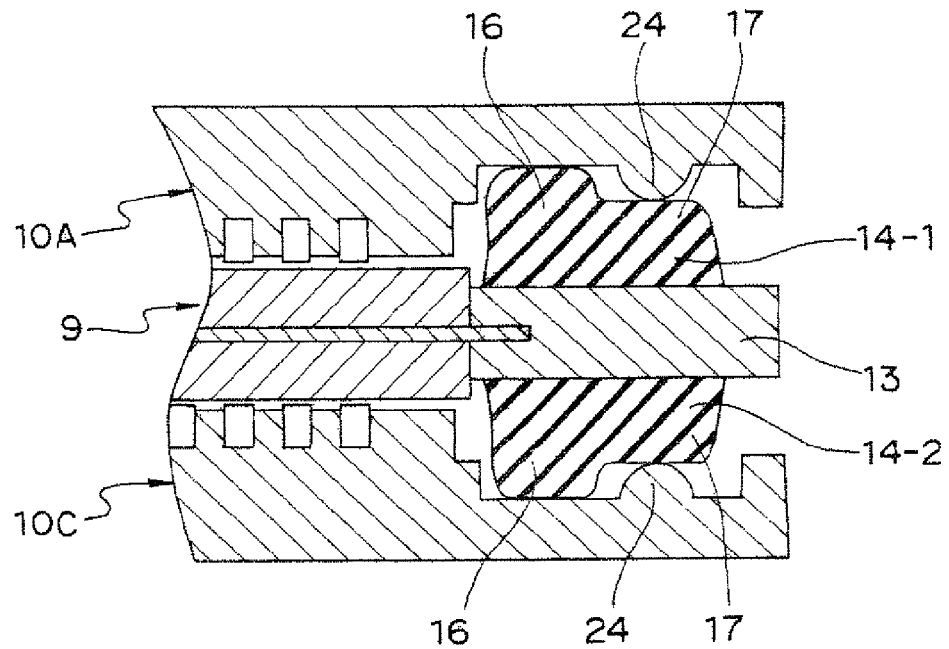
FIG. 7B is a partial cross-sectional view of the gasket structure according to the third embodiment of the present invention when fastened.
Figure 8:
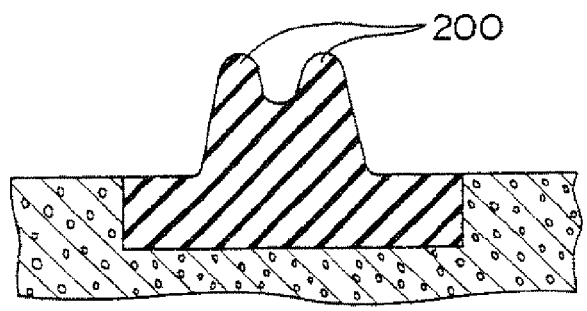
FIG. 8 is a partial cross-sectional view showing one example of an embodiment of Patent Document 1.
Figure 9:
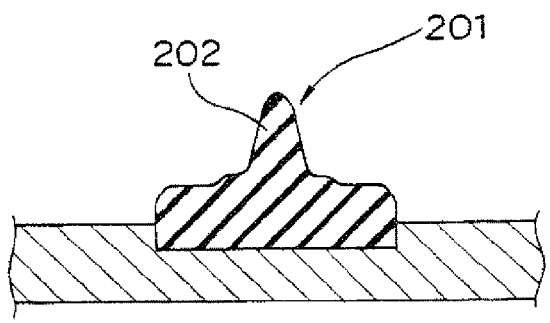
FIG. 9 is a partial cross-sectional view showing one example of an embodiment of Patent Document 2.

FIG. 7A is a partial cross-sectional view of a seal structure according to a third embodiment of the present invention. The gasket 14 has a two-stepped bell-shaped structure, in which the second sealing lip 16 on the MEA 9 side is two-stepped. The sealing lip 17 on the outside air side is plate-like, while the facing counter separator 10A or 10C is provided with a convex portion 24 which is in a vertical cross-sectional circular shape and convex-shaped. Similarly to the second embodiment, the ensured sealing performance can be retained by the second sealing lip 16, and further, it becomes possible to secure the sealing performance with the sealing lip 17 on the outside air side and the convex portion 24 using a small fastening force. Further, depending on the material or the internal or the external environment, it is also effective to dispose the sealing lip 17 of the plate-like structure on the inner side, and to employ the two-stepped bell-shaped second sealing lip 16 on the outer side. It is to be noted that, FIG. 7A shows the separator shape such that the seal groove shape of the separators can clearly be seen, and does not show the cross section when fastened. It shows the state where the MEA and the separators are virtually assembled and, therefore, each seal does not elastically deform at all. In contrast thereto, FIG. 7B is a partial cross-sectional view of the fastened gasket structure according to the third embodiment, in which each seal elastically deforms.

It is to be noted that, by appropriately combining any embodiments described above, their respective effects can be exhibited.

INDUSTRIAL APPLICABILITY

The polymer electrolyte fuel cell-use gasket of the present invention is useful as a fuel cell-use gasket used for a portable power supply, an electric vehicle-use power supply, a household cogeneration system, or the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:
1. A polymer electrolyte fuel cell-use gasket, included in a polymer electrolyte fuel cell comprising a fuel cell stack in which a stacked product is assembled by being clamped by a fastening member via paired end plates respectively disposed at first and second ends of the stacked product, the stacked product being formed of a plurality of unit cell modules that are stacked, each of the unit cell modules comprising: a membrane electrode assembly; a first sealing member disposed at an external circumference of a front surface of the membrane electrode assembly; a second sealing member disposed at an external circumference of a back surface of the membrane electrode assembly; and first and second separators sandwiching the membrane electrode assembly and the first and second sealing members,
wherein, in the first sealing member:
the first sealing member is integrally molded with the external circumference portion of the front surface of the membrane electrode assembly,
the first sealing member comprises two rows of sealing lips each having a sealing performance that can be exhibited relative to the first separator, the rows being continuously provided in parallel to each other in a same plane,
at least an outer one of the two rows of sealing lips is integrally formed so as to have a top side bell-shaped portion overlaid on a bottom side bell-shaped portion in a height direction, a radius of curvature of an apex of the bottom side bell-shaped portion is greater than a radius of curvature of an apex of the top side bell-shaped portion, and a following relationship is satisfied: W>h>0 and W>d>0, where a width of a bottom plane of the bottom side bell-shaped portion is W; a width of a continuing portion arranged between the two rows of sealing lips is d; and a height from the bottom plane of the bottom side bell-shaped portion to the apex of the top side bell-shaped portion is h; and wherein, in the second sealing member:

the second sealing member is integrally molded with the external circumference portion of the back surface of the membrane electrode assembly, the second sealing member comprises two rows of sealing lips each having a sealing performance that can be exhibited relative to the second separator, the rows being continuously provided in parallel to each other in a same plane, at least an outer one of the two rows of sealing lips is integrally formed so as to have a top side bell-shaped portion overlaid on a bottom side bell-shaped portion in a height direction, a radius of curvature of an apex of the bottom side bell-shaped portion is greater than a radius of curvature of an apex of the top side bell-shaped portion, and a following relationship is satisfied: W>h>0 and W>d>0, where a width of a bottom plane of the bottom side bell-shaped portion is W; a width of a continuing portion arranged between the two rows of sealing lips is d; and a height from the bottom plane of the bottom side bell-shaped portion to the apex of the top side bell-shaped portion is h.

2. The polymer electrolyte fuel cell-use gasket according to claim 1, wherein, in the first sealing member:

the radius of curvature of the apex of the bottom side bell-shaped portion is R1, and the radius of curvature of the apex of the top side bell-shaped portion is R2, a correlation between the radius of curvature R1 and the radius of curvature R2 satisfies R1×0.5≥R2, and the continuing portion includes a top surface that faces a bottom surface of the first separator, the top surface of the continuing portion being closer to a longitudinal axis of the membrane electrode assembly than the bottom surface of the first separator; and wherein, in the second sealing member:

the radius of curvature of the apex of the bottom side bell-shaped portion is R1, and the radius of curvature of the apex of the top side bell-shaped portion is R2, a correlation between the radius of curvature R1 and the radius of curvature R2 satisfies R1×0.5≥R2, and the continuing portion includes a top surface that faces a bottom surface of the second separator, the top surface of the continuing portion being closer to a longitudinal axis of the membrane electrode assembly than the bottom surface of the second separator.

3. The polymer electrolyte fuel cell-use gasket according to claim 1, wherein, in the first sealing member:

a vertex angle of the bottom side bell-shaped portion and a vertex angle of the top side bell-shaped portion are each 18° or more, and following relationship is satisfied: H/D≤0.60, where a total width of the first sealing member along a plane where the first sealing member is in contact with the external circumference of the membrane electrode assembly is D; and a total height of the first sealing member from the plane where the first sealing member is in contact with the external circumference of the membrane electrode assembly to the apex of the top side bell-shaped portion is H; and wherein, in the second sealing member:

a vertex angle of the bottom side bell-shaped portion and a vertex angle of the top side bell-shaped portion are each 18° or more, and a following relationship is satisfied: H/D≤0.60, where a total width of the second sealing member along a plane where the second sealing member is in contact with the external circumference of the membrane electrode assembly is D; and a total height of the second sealing member from the plane where the second sealing member is in contact with the external circumference of the membrane electrode assembly to the apex of the top side bell-shaped portion is H.

4. The polymer electrolyte fuel cell-use gasket according to claim 1, wherein, in the first sealing member:

a cross section nearby the apex of the top side bell-shaped portion and a cross section nearby the apex of the bottom side bell-shaped portion are both circular, the top side bell-shaped portion is a deformation facilitated portion, in which a portion of the apex of the top side bell-shaped portion elastically deforms greater than a portion of the apex of the bottom side bell-shaped portion does when being brought into contact with the first separator when the fuel cell stack is assembled, and the bottom side bell-shaped portion is a seal area enlarging portion, in which, after the deformation facilitated portion elastically deforms greatly, the portion of the apex of the bottom side bell-shaped portion deforms to enlarge a seal area relative to the first separator; and wherein, in the second sealing member:

a cross section nearby the apex of the top side bell-shaped portion and a cross section nearby the apex of the bottom side bell-shaped portion are both circular, the top side bell-shaped portion is a deformation facilitated portion, in which a portion of the apex of the top side bell-shaped portion elastically deforms greater than a portion of the apex of the bottom side bell-shaped portion does when being brought into contact with the second separator when the fuel cell stack is assembled, and the bottom side bell-shaped portion is a seal area enlarging portion, in which, after the deformation facilitated portion elastically deforms, the portion of the apex of the bottom side bell-shaped portion deforms to enlarge a seal area relative to the second separator.

5. The polymer electrolyte fuel cell-use gasket according to claim 2, wherein, in the first sealing member:

a vertex angle of the bottom side bell-shaped portion and a vertex angle of the top side bell-shaped portion are each 18° or more, and a following relationship is satisfied: H/D≤0.60, where a total width of the first sealing member along a plane where the first sealing member is in contact with the external circumference of the membrane electrode assembly is D; and a total height of the first sealing member from the plane where the first sealing member is in contact with the external circumference of the membrane electrode assembly to the apex of the top side bell-shaped portion is H; and wherein, in the second sealing member:

a vertex angle of the bottom side bell-shaped portion and a vertex angle of the top side bell-shaped portion are each 18° or more, and a following relationship is satisfied: H/D≤0.60, where a total width of the second sealing member along a plane where the second sealing member is in contact with the external circumference of the membrane electrode assembly is D; and a total height of the second sealing member from the plane where the second sealing member is in contact with the external circumference of the membrane electrode assembly to the apex of the top side bell-shaped portion is H.

6. The polymer electrolyte fuel cell-use gasket according to claim 2, wherein, in the first sealing member:
a cross section nearby the apex of the top side bell-shaped portion and a cross section nearby the apex of the bottom side bell-shaped portion are both circular,
the top side bell-shaped portion is a deformation facilitated portion, in which a portion of the apex of the top side bell-shaped portion elastically deforms greater than a portion of the apex of the bottom side bell-shaped portion does when being brought into contact with the first separator when the fuel cell stack is assembled, and
the bottom side bell-shaped portion is a seal area enlarging portion, in which, after the deformation facilitated portion elastically deforms greatly, the portion of the apex of the bottom side bell-shaped portion deforms to enlarge a seal area relative to the first separator; and
wherein, in the second sealing member:
a cross section nearby the apex of the top side bell-shaped portion and a cross section nearby the apex of the bottom side bell-shaped portion are both circular,
the top side bell-shaped portion is a deformation facilitated portion, in which a portion of the apex of the top side bell-shaped portion elastically deforms greater than a portion of the apex of the bottom side bell-shaped portion does when being brought into contact with the second separator when the fuel cell stack is assembled, and
the bottom side bell-shaped portion is a seal area enlarging portion, in which, after the deformation facilitated portion elastically deforms, the portion of the apex of the bottom side bell-shaped portion deforms to enlarge a seal area relative to the second separator.

7. The polymer electrolyte fuel cell-use gasket according to claim 3, wherein, in the first sealing member:
a cross section nearby the apex of the top side bell-shaped portion and a cross section nearby the apex of the bottom side bell-shaped portion are both circular,
the top side bell-shaped portion is a deformation facilitated portion, in which a portion of the apex of the top side bell-shaped portion elastically deforms greater than a portion of the apex of the bottom side bell-shaped portion does when being brought into contact with the first separator when the fuel cell stack is assembled, and
the bottom side bell-shaped portion is a seal area enlarging portion, in which, after the deformation facilitated portion elastically deforms greatly, the portion of the apex of the bottom side bell-shaped portion deforms to enlarge a seal area relative to the first separator; and
wherein, in the second sealing member:
a cross section nearby the apex of the top side bell-shaped portion and a cross section nearby the apex of the bottom side bell-shaped portion are both circular,
the top side bell-shaped portion is a deformation facilitated portion, in which a portion of the apex of the top side bell-shaped portion elastically deforms greater than a portion of the apex of the bottom side bell-shaped portion does when being brought into contact with the second separator when the fuel cell stack is assembled, and
the bottom side bell-shaped portion is a seal area enlarging portion, in which, after the deformation facilitated portion elastically deforms, the portion of the apex of the bottom side bell-shaped portion deforms to enlarge a seal area relative to the second separator.

* * * * *